US011155312B2

(12) United States Patent
Shiga et al.

(10) Patent No.: US 11,155,312 B2
(45) Date of Patent: Oct. 26, 2021

(54) MOVABLE SPOILER DEVICE

(71) Applicant: AISIN SEIKI KABUSHIKI KAISHA, Kariya (JP)

(72) Inventors: Tokuhiro Shiga, Kariya (JP); Taishi Hashimoto, Kariya (JP); Yukihide Shibutani, Kariya (JP); Hideki Mizuno, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 68 days.

(21) Appl. No.: 16/690,480

(22) Filed: Nov. 21, 2019

(65) Prior Publication Data
US 2020/0164934 A1    May 28, 2020

(30) Foreign Application Priority Data

Nov. 22, 2018 (JP) .............................. JP2018-219436
Nov. 6, 2019 (JP) .............................. JP2019-201526

(51) Int. Cl.
*B62D 35/00* (2006.01)
*F16D 11/14* (2006.01)
(52) U.S. Cl.
CPC ............ *B62D 35/005* (2013.01); *F16D 11/14* (2013.01)
(58) Field of Classification Search
CPC .... B62D 35/00; B62D 35/001; B62D 35/005; B62D 35/02; F16D 11/14
USPC ............................... 296/180.1, 180.2, 180.3
See application file for complete search history.

(56) References Cited

U.S. PATENT DOCUMENTS

| 9,039,068 | B2 | 5/2015 | Niemi et al. | |
|---|---|---|---|---|
| 9,956,998 | B2* | 5/2018 | Zielinski | B62D 37/02 |
| 10,124,839 | B2 | 11/2018 | Povinelli et al. | |
| 2011/0049913 | A1* | 3/2011 | Bernt | B60R 19/48 |
| | | | | 293/102 |
| 2015/0210325 | A1* | 7/2015 | DeAngelis | B62D 35/02 |
| | | | | 296/180.1 |
| 2017/0120968 | A1 | 5/2017 | Povinelli et al. | |
| 2018/0134329 | A1* | 5/2018 | Cha | B62D 35/007 |
| 2019/0061839 | A1* | 2/2019 | Schmitt | B62D 37/02 |
| 2019/0118872 | A1* | 4/2019 | Shiga | B62D 35/005 |
| 2019/0368237 | A1* | 12/2019 | Distefano | E05B 81/16 |

FOREIGN PATENT DOCUMENTS

| CN | 106536334 | 3/2017 |
|---|---|---|
| JP | 6-227444 | 8/1994 |

OTHER PUBLICATIONS

U.S. Appl. No. 16/580,241, filed Sep. 24, 2019.

* cited by examiner

*Primary Examiner* — Jason S Daniels
(74) *Attorney, Agent, or Firm* — Finnegan, Henderson, Farabow, Garrett & Dunner, LLP

(57) ABSTRACT

A movable spoiler device provided in a front part of a vehicle body, the movable spoiler device includes: a link mechanism in which a plurality of links are coupled and configured to operate by driving the links by an actuator; a spoiler member connected with one of the plurality of links and being deployable and retractable with respect to the vehicle body by operation of the link mechanism; and a clutch mechanism provided on a driving force transmission path between the actuator and the spoiler member, and configured to block transmission of a driving force when an external force equal to or greater than a predetermined value is applied to the spoiler member with the spoiler member being in a deployed state.

10 Claims, 18 Drawing Sheets

CREST AND TROUGH SHAPE (OUTER PERIPHERAL PART) OF ENGAGEMENT SURFACES (S1, S2) OF FIRST AND SECOND ENGAGEMENT MEMBERS (61, 62)

CIRCUMFERENTIAL DIRECTION

CREST AND TROUGH SHAPE OF ENGAGEMENT SURFACES (S1', S2') OF INNER AND OUTER ENGAGEMENT MEMBERS (41, 42) OF FIRST EMBODIMENT

CIRCUMFERENTIAL DIRECTION

CREST AND TROUGH SHAPE (INNER PERIPHERAL PART) OF ENGAGEMENT
SURFACES (S1, S2) OF FIRST AND SECOND ENGAGEMENT MEMBERS (61, 62)

CIRCUMFERENTIAL DIRECTION

CIRCUMFERENTIAL DIRECTION

MOVABLE SPOILER DEVICE

CROSS REFERENCE TO RELATED APPLICATIONS

This application is based on and claims priority under 35 U.S.C. § 119 to Japanese Patent Application 2018-219436, filed on Nov. 22, 2018, and Japanese Patent Application 2019-201526, filed on Nov. 6, 2019, the entire contents of which are incorporated herein by reference.

TECHNICAL FIELD

This disclosure relates to a movable spoiler device provided in a front part of a vehicle body.

BACKGROUND DISCUSSION

Related art discloses a movable spoiler device in which a spoiler member can be operated between a retracted position where the spoiler member is retracted inside a vehicle and a deployed position where the spoiler member is deployed downward of the vehicle from the retracted position so as to reduce air resistance during vehicle traveling (for example, see JP 6-227444A).

The movable spoiler device disclosed in JP 6-227444A includes a plurality of links including an arm fixed to the spoiler member, and an actuator configured to drive the links, in which at least one of the plurality of links is formed of a perforated member that can be elastically deformed. According to such a configuration, when the spoiler member interferes with an obstacle on a road surface and an external force is applied on the spoiler member, the link is elastically deformed to absorb the external force.

Incidentally, in the movable spoiler device as described above, the link is made of the member that can be elastically deformed, so that the external force applied on the spoiler member can be well absorbed, but when considering that the link needs to be rigid enough to withstand wind pressure, a volume of elastic deformation cannot be increased. For this reason, even if the link is elastically deformed, the external force may still be applied on the link.

Thus, a need exists for a movable spoiler device which is not susceptible to the drawback mentioned above.

SUMMARY

A movable spoiler device according to an aspect of this disclosure is provided in a front part of a vehicle body and includes: a link mechanism in which a plurality of links are coupled, and configured to operate by driving the links by an actuator; a spoiler member connected with one of the plurality of links, and being deployable and retractable with respect to the vehicle body by operation of the link mechanism; and a clutch mechanism provided on a driving force transmission path between the actuator and the spoiler member, and configured to block transmission of a driving force when an external force equal to or greater than a predetermined value is applied to the spoiler member with the spoiler member being in a deployed state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a first embodiment of a movable spoiler device will be described.

Figure 1:
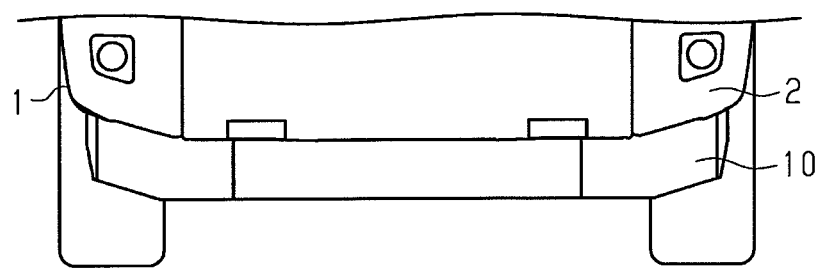
FIG. 1 is a front view illustrating a part of a vehicle according to a first embodiment.

As illustrated in FIG. 1, a movable spoiler device 10 that is retractable with respect to a front bumper 2 is provided at a lower portion on a front side of a vehicle 1.

Figure 2:
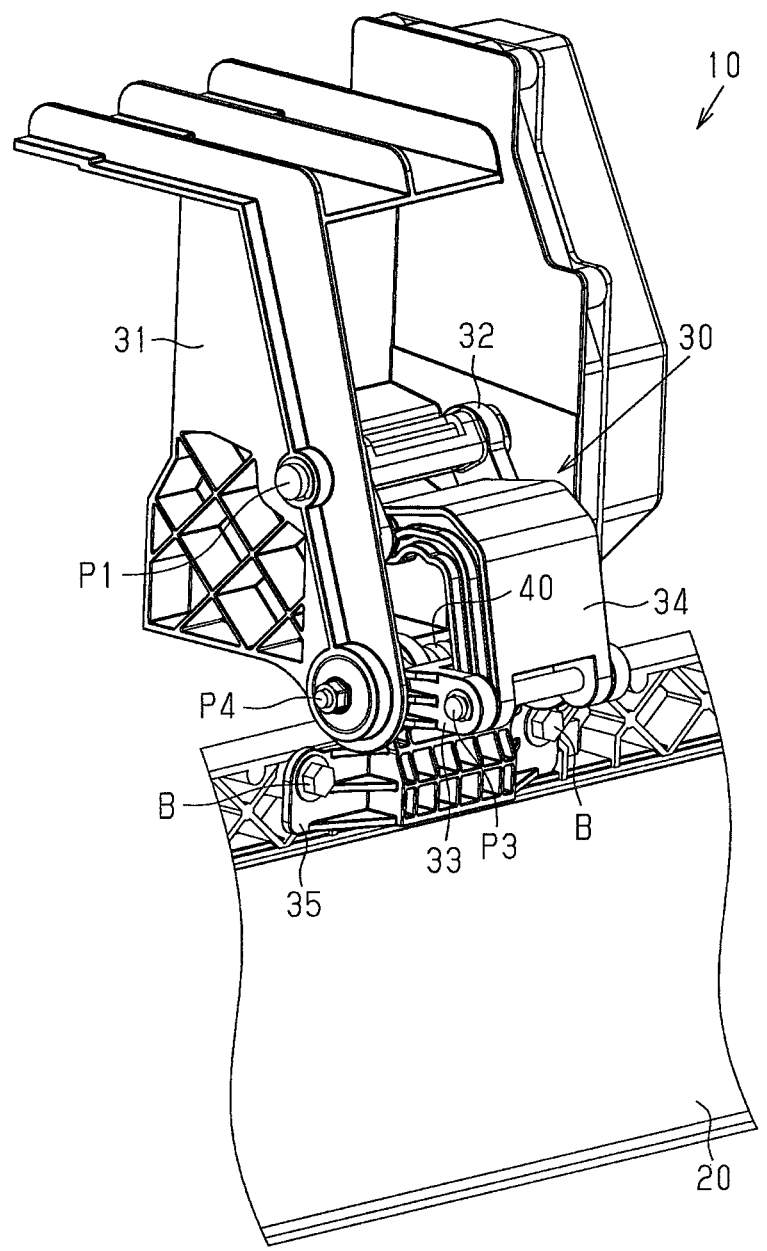
FIG. 2 is a perspective view illustrating a deployed state of a spoiler member of a movable spoiler device according to the first embodiment.
Figure 3:
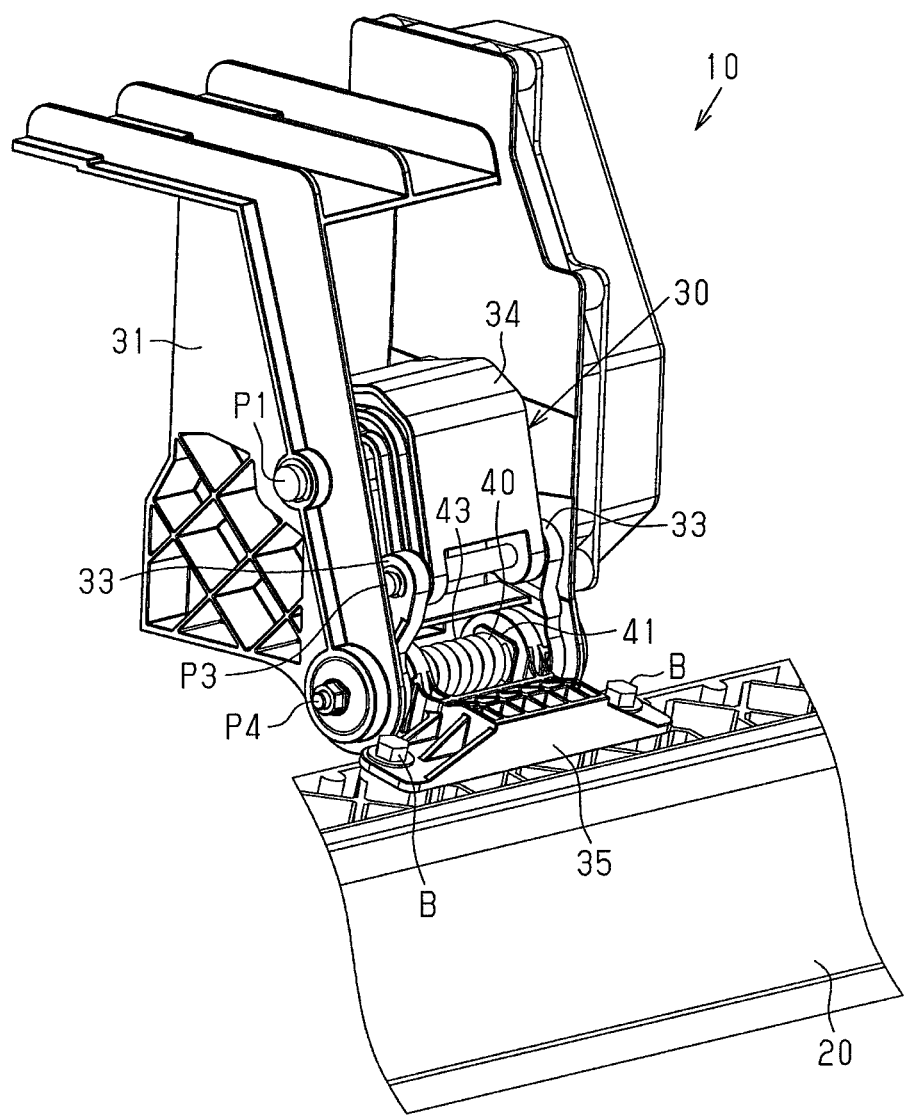
FIG. 3 is a perspective view illustrating a retracted state of the spoiler member of the movable spoiler device according to the first embodiment.

As illustrated in FIGS. 2 and 3, the movable spoiler device 10 includes a spoiler member 20, a link mechanism 30, and a clutch mechanism 40.

As illustrated in FIGS. 1 to 3, the spoiler member 20 is a plate-shaped member extending in a vehicle width direction (left-right direction in Figs). Both two end portions of the spoiler member 20 in the vehicle width direction are formed such that a length in a direction orthogonal to a plate thickness becomes narrower toward the outside. The spoiler member 20 is supported by the link mechanism 30 and a support member (not illustrated). The spoiler member 20 of the embodiment is supported by one link mechanism 30 on an inner side (center side) of the spoiler member 20 in the vehicle width direction, and supported by two support members on outer sides of the spoiler member 20 in the vehicle width direction. The configuration in which two or more link mechanisms 30 are provided may be employed.

Figure 6:
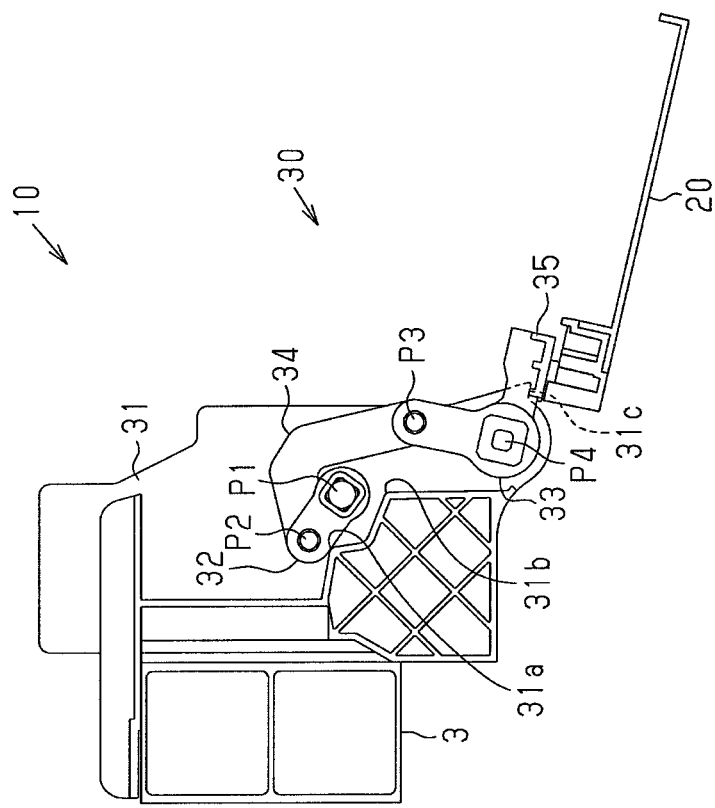
FIG. 6 is a side view illustrating the retracted state of the movable spoiler device according to the first embodiment.

As illustrated in FIGS. 2, 3, and 6, the link mechanism 30 includes a drive link 32 and a driven link 33 that are coupled to a bracket 31 fixed to a bumper reinforcement 3 (see FIG. 6), an intermediate link 34 connected between the drive link 32 and the driven link 33, and a connection link 35 as a link fixed to a spoiler side. Moreover, the bracket 31 of the embodiment functions as a fixed link. That is, the link mechanism 30 of the embodiment employs a four-joint linkage mechanism in which the bracket 31, the drive link 32, the intermediate link 34, and the driven link 33 are annularly coupled. The bracket 31 is fixed to the bumper reinforcement 3, the spoiler member 20 is fixed to the driven link 33 via the connection link 35, and the drive link 32 is driven by a motor (not shown) serving as an actuator in the link mechanism 30. Thus, the spoiler member 20 is retractable with respect to the front bumper 2.

As illustrated in FIGS. 3 and 6, one end of the drive link 32 is supported by the bracket 31 so as to be rotatable around a drive shaft P1. The drive shaft P1 is coupled with a rotation shaft (not illustrated) of the motor that can be driven in both of normal and reverse rotation directions via a gear mechanism. That is, the motor rotationally drives the drive shaft P1, so that the drive link 32 is rotated with the drive shaft P1 as a fulcrum. One end of the intermediate link 34 is rotatably coupled to the other end of the drive link 32 via a coupling shaft P2.

As illustrated in FIG. 3, the intermediate link 34 is formed to be bent approximately 90 degrees at a midway position. One end of the driven link 33 is rotatably coupled to the other end of the intermediate link 34 via a coupling shaft P3.

As illustrated in FIGS. 3 and 6, the other end of the driven link 33 as a coupling link is rotatably coupled to the bracket 31 via a driven shaft P4. Further, the driven link 33 is coupled with the connection link 35 via the driven shaft P4. That is, the driven link 33 and the connection link 35 are coupled to the bracket 31 via the driven shaft P4.

As illustrated in FIGS. 3 and 6, the connection link 35 is fixed to the spoiler member 20 by bolts B, so as to support the spoiler member 20. That is, a positional relationship between the connection link 35 and the spoiler member 20 does not change, and the spoiler member 20 rotates as the connection link 35 rotates around the driven shaft P4 as a center.

Figure 7:
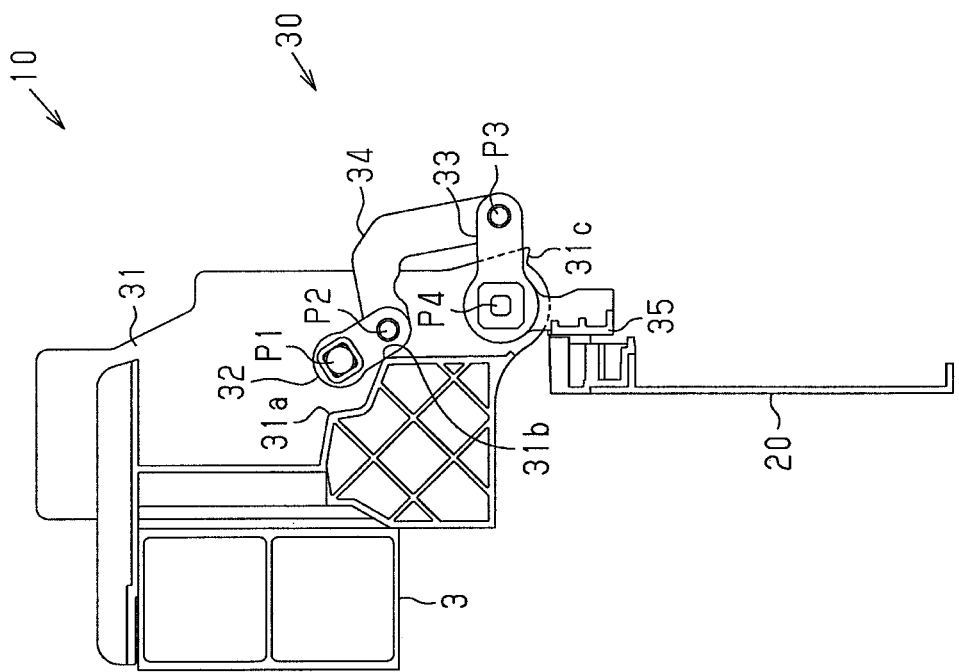
FIG. 7 is a side view illustrating the deployed state of the movable spoiler device according to the first embodiment.

As illustrated in FIGS. 6 and 7, the bracket 31 has two abutting portions 31a and 31b that are abutted against the drive link 32 to regulate a rotation range of the drive link 32. When the drive link 32 is rotated counterclockwise in FIG. 6 around the drive shaft P1, the abutting portion 31a abuts against the drive link 32 in a turn-over state where the drive link 32 and the intermediate link 34 pass through dead points that are in a straight line. Therefore, in a retracted state illustrated in FIG. 6, the abutting portion 31a receives own weights of the drive link 32 and the member connected with the drive link 32, such that a load is not applied to the drive shaft P1 and an actuator side connected with the drive shaft P1.

Further, when the drive link 32 is rotated clockwise in FIG. 7 around the drive shaft P1, the abutting portion 31b abuts against the drive link 32 in a turn-over state where the drive link 32 and the intermediate link 34 pass through dead points that are in the straight line. Therefore, in a deployed state illustrated in FIG. 7, the abutting portion 31b receives a load of wind power applied to the spoiler member 20, such that the load is not applied to the drive shaft P1 and the actuator side connected to the drive shaft P1.

The bracket 31 is provided with a stopper 31c that regulates a rotation of the connection link 35. The stopper 31c abuts against the connection link 35 in the retracted state illustrated in FIG. 6 or a cancel state illustrated in FIG. 8, so as to regulate the rotation of the connection link 35.

As illustrated in FIGS. 2 to 5, the clutch mechanism 40 is provided in the driven shaft P4. The clutch mechanism 40 is configured to be a so-called dog clutch mechanism, and includes a pair of inner engagement members 41 having a cylindrical shape, a pair of outer engagement members 42 having a cylindrical shape, and a coil spring 43.

The outer engagement members 42 are disposed opposite to each other on each outer side of the inner engagement members 41 in an axial direction. The connection link 35 is connected to each inner engagement member 41 so as to be integrally rotatable with the inner engagement members 41. Further, the driven link 33 is connected to each outer engagement member 42 so as to be integrally rotatable with the outer engagement members 42.

The coil spring 43 is interposed between the pair of the inner engagement members 41, and applies force to outsides in the axial direction of the driven shaft P4. That is, the coil spring 43 applies the force to the inner engagement members 41 toward the outer engagement members 42.

The inner engagement members 41 and the outer engagement members 42 have engagement portions 41a and 42a that can be engaged with each other in the rotation direction. The engagement portions 41a of the inner engagement members 41 and the engagement portions 42a of the outer engagement members 42 are maintained in an engaged state by the force applied by the coil spring 43. For this reason, when each of the engagement portions 41a and 42a are in the engaged state in the rotation direction, the inner engagement members 41 and the outer engagement members 42 rotate synchronically. That is, when the engagement portions 41a and 42a are meshed with each other in the rotation direction (engaged state), the inner engagement members 41 and the outer engagement members 42 rotate synchronically, so that the driven link 33 and the connection link 35 are rotated synchronically.

Engagement surfaces of the engagement portions 41a and 42a that are engaged with each other are inclined surfaces inclined with respect to the rotation direction. Here, for example, when an external force is applied to the spoiler member 20, the external force is converted into a thrust force that resists the force applied by the coil spring 43 on the inclined surfaces of the engagement portions 41a and 42a via the connection link 35. When this thrust force exceeds the force applied by the coil spring 43, the inner engagement members 41 move toward a center side of the axial direction to compress the coil spring 43, and the engaged state (mesh with each other) of the engagement portions 41a and 42a is released. As a result, a driving connection between the inner engagement members 41 and the outer engagement members 42 is released, so that the driven link 33 is not rotated when the connection link 35 is rotated around the driven shaft P4. That is, when the thrust force based on the external force applied on the spoiler member 20 exceeds the force applied by the coil spring 43, the connection link 35 and the spoiler member 20 are rotated and the external force to be applied on the actuator side including the driven link 33 is reduced. The force applied by the coil spring 43 used in the embodiment can be set as appropriate, and is set such that the force applied by the coil spring 43 exceeds the thrust force based on an external force when the external force due to wind pressure is applied during traveling. Meanwhile, when an external force caused by collision with an obstacle or the like is applied during traveling, the force applied by the coil spring 43 is set such that the thrust force based on the external force exceeds the force applied by the coil spring 43.

Operations of the first embodiment disclosed here are described below.

The movable spoiler device 10 of the embodiment is in the retracted state where the spoiler member 20 is retracted in the front bumper 2 when viewed from the front of the vehicle 1 during the vehicle 1 being stopped or travelling at a low speed, and is in the deployed state where the spoiler member 20 is deployed from the front bumper 2 during travelling at a high speed.

As illustrated in FIG. 6, the drive link 32 is rotated counterclockwise in the drawing illustrating the retracted state, and the spoiler member 20 is maintained in a state inclined toward the rear of the vehicle 1. At this time, the drive link 32 abuts against the abutting portion 31a in the turn-over state where the drive link 32 and the intermediate link 34 pass through the dead points that are in the straight line, so that the abutting portion 31a receives the own weights of the drive link 32 and the member connected to the drive link 32, and the load is not applied to the drive shaft P1 and the actuator side connected to the drive shaft P1.

As illustrated in FIG. 7, the drive link 32 is rotated clockwise in the drawing illustrating the deployed state, and the spoiler member 20 is maintained in a state vertically downward. At this time, the drive link 32 abuts against the abutting portion 31b in the turn-over state where the drive link 32 and the intermediate link 34 pass through the dead points that are in the straight line, so that the abutting portion 31b receives the load of wind power applied to the spoiler member 20, and the load is not applied to the drive shaft P1 and the actuator side connected to the drive shaft P1.

Figure 8:
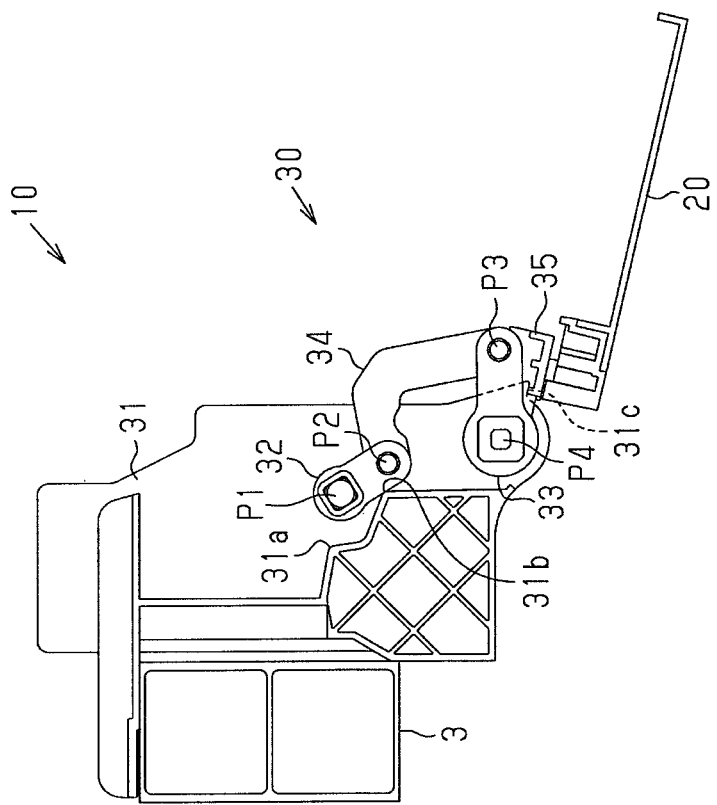
FIG. 8 is a side view illustrating a cancel state of the movable spoiler device according to the first embodiment.

Further, the movable spoiler device 10 of the embodiment is provided with the clutch mechanism 40. In the deployed state illustrated in FIG. 7, when an obstacle collides with the spoiler member 20 from the front, the transmission of a driving force (external force) from a side of the spoiler member 20 is blocked by the clutch mechanism 40. For this reason, as illustrated in FIG. 8, the spoiler member 20 and the connection link 35 are rotated counterclockwise of the drawing around the driven shaft P4. The connection link 35 is abutted against the stopper 31c, so as to be in the cancel state where further rotation of the connection link 35 and the spoiler member 20 is prevented.

Figure 9:
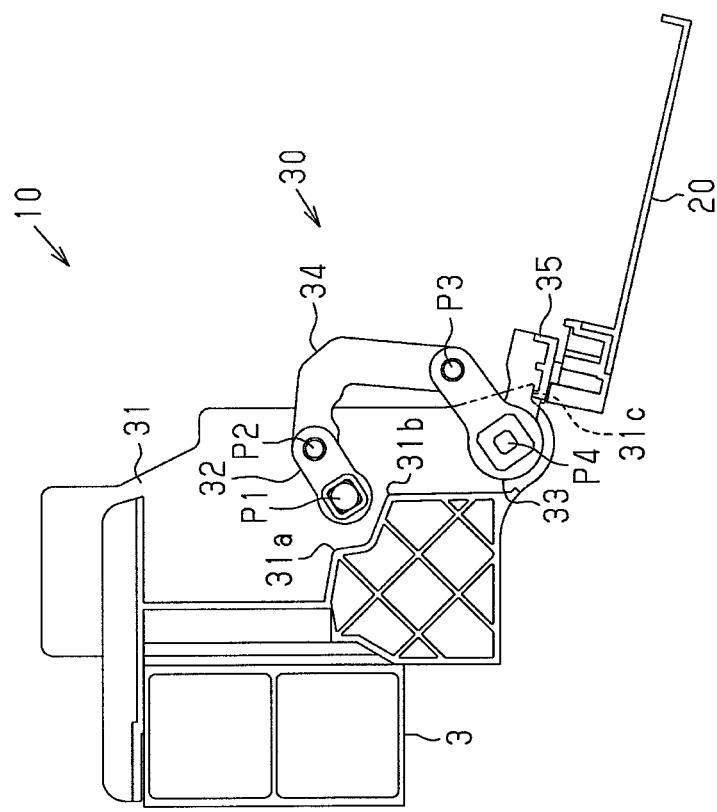
FIG. 9 is a side view illustrating the movable spoiler device according to the first embodiment during returning.

As illustrated in FIG. 9, when the drive shaft P1 is rotated by the driving force of the actuator to integrally rotate the outer engagement members 42 in the driven shaft P4 via the links 32, 34, and 33, the outer engagement members 42 and the inner engagement members 41 are engaged with each other, such that a state where the driving force can be transmitted is returned from the cancel state by the clutch mechanism 40.

Effects of the first embodiment disclosed here are described below.

(1) According to the first embodiment, the movable spoiler device 10 is provided in a front part of the vehicle body and includes: the link mechanism 30 in which plural links are coupled, and configured to operate by driving the links by an actuator; the spoiler member 20 connected with one of the plural links, and being deployable and retractable with respect to the vehicle body by operation of the link mechanism 30; and the clutch mechanism 40 provided on a driving force transmission path between the actuator and the spoiler member 20, and configured to block transmission of a driving force when an external force equal to or greater than a predetermined value is applied to the spoiler member 20 with the spoiler member 20 being in a deployed state.

Even when the external force is applied to the spoiler member 20 due to interference with an obstacle or the like, the transmission of the driving force (external force) is blocked by the clutch mechanism 40, the external force applied to the spoiler member 20 can be well absorbed, and the external force can be prevented from applying to the link mechanism 30 and the actuator side.

(2) In the movable spoiler device 10, the clutch mechanism 40 may be provided in the link mechanism 30 on the coupling shaft (the driven shaft P4) that couples a spoiler fixing link (the connection link 35) to which the spoiler member 20 is fixed, with a coupling link (the driven link 33) coupled to the spoiler fixing link 35.

The clutch mechanism 40 is provided in the driven shaft P4 as the coupling shaft that couples the connection link 35 with the driven link 33, so that the external force can be prevented from applying to the actuator side including the driven link 33.

(3) The movable spoiler device 10 further includes a regulating portion configured to abut against the spoiler member 20 to regulate rotation of the spoiler member 20 when the spoiler member 20 is rotated from the deployed state to a retracted state by the external force in a state where the transmission of the driving force is blocked by the clutch mechanism 40, and the link mechanism 30 is operated in a state where the rotation of the spoiler member 20 is regulated by the regulating portion such that the state where the transmission of the driving force is blocked by the clutch mechanism 40 is returned to a state where the driving force is transmitted.

The state where the driving force is blocked by the clutch mechanism 40 can be returned to the state where the driving force is transmitted.

(4) In the movable spoiler device 10, the link mechanism 30 may be a four-joint linkage mechanism.

The driving force of the actuator can be transmitted to the spoiler member 20 by using a general-purpose four-joint linkage mechanism in the link mechanism 30.

A second embodiment is explained below. Components of the second embodiment similar to those of the first embodiment bear the same reference numerals and explanations thereof are omitted.

As illustrated in FIGS. 11 to 16, a movable spoiler device 10B of the second embodiment includes a clutch mechanism 40B that is constructed differently from the clutch mechanism 40 of the first embodiment.

The clutch mechanism 40B of the second embodiment includes a first engagement member 61 and a second engagement member 62 that respectively include engagement surfaces S1 and S2 and that are provided coaxially with each other. Each of the engagement surfaces S1 and S2 includes bulge (upper) portions Sa and recess (lower) portions Sb that are alternately and continuously arranged along a circumferential direction of each engagement surface S1 or S2. Specifically, each of the engagement surfaces S1 and S2 includes two pairs of the bulge portions Sa and the recess portions Sb that are alternately and continuously arranged along the circumferential direction. The first engagement member 61 and the second engagement member 62 that are arranged coaxially with each other are relatively rotatable and relatively movable in an axial direction in a state where the engagement surfaces S1 and S2 are opposed to each other. The clutch mechanism 40B includes a biasing member 63 generating a biasing force in the axial direction for engaging the engagement surface S1 of the first engagement member 61 with the engagement surface S2 of the second engagement member 62 that are opposed to each other in the axial direction.

The relative rotation between the first engagement member 61 and the second engagement member 62 are restricted in a state where the engagement surfaces S1 and S2 thereof engage with each other, specifically, in a state where the bulge portions Sa and the recess portions Sb of the engagement surface S1 are meshed with the recess portions Sb and the bulge portions Sa of the engagement surface S2. In addition, the relative rotation between the first engagement member 61 and the second engagement member 62 is permitted by the engagement surfaces S1 and S2 sliding on each other in the circumferential direction while moving relative to each other in the axial direction against the biasing force of the biasing member 63. The clutch mechanism 40B of the second embodiment is configured to be a dog clutch mechanism that is the same as the clutch mechanism 40 according to the first embodiment.

In the clutch mechanism 40B of the second embodiment, the first engagement member 61 and the second engagement member 62 in a first pair are arranged at a first axial end of the driven shaft P4 (see FIGS. 2 to 5) constituting a support shaft of the spoiler member 20 and the first engagement member 61 and the second engagement member 62 in a second pair are arranged at a second axial end of the driven shaft P4. Specifically, the clutch mechanism 40B of the second embodiment includes the first engagement members 61 corresponding to the inner engagement members 41 of the first embodiment and the second engagement members 62 corresponding to the outer engagement members 42 of the first embodiment. In addition, the biasing member 63 fitted on the driven shaft P4 axially outwardly biases the first engagement members 61 that are arranged at opposed sides of the biasing member 63. The clutch mechanism 40B of the second embodiment is constructed in a manner that the engagement surface S1 of each first engagement member 61 is pressed against the engagement surface S2 of each second engagement member 62 facing each other in the axial direction so that the engagement surface S1 and the engagement surface S2 engage with each other.

Specifically, the first engagement member 61 fixed to the connection link 35 that rotatably supports the spoiler member 20 and the second engagement member 62 fixed to the driven link 33 of the link mechanism 30 that constitutes a drive transmission system are rotatably connected to each other in the meshed state of the engagement surface S1 of the first engagement member 61 and the engagement surface S2 of the second engagement member 62. In addition, the spoiler device 10B of the second embodiment is constructed in a manner that the first engagement member 61 and the second engagement member 62 in each of the first and second pairs integrally rotate about a rotation axis L constituted by the driven shaft P4 in accordance with a drive force of an actuator that is transmitted through the link mechanism 30. The movable spoiler device 10B of the second embodiment is configured so that the spoiler member 20 including a pivot shaft that is constituted by the driven shaft P4 rotates in a deployed direction and a retracted direction (see FIGS. 6 and 7).

In the clutch mechanism 40B, an external force input to the spoiler member 20 is converted, by an up-and-down configuration specified at each of the engagement surfaces S1 and S2, into a thrust force acting in a direction where the first engagement member 61 and the second engagement member 62 in each of the first and second pairs separate from each other.

In a case where the spoiler member 20 of the movable spoiler device 10B of the second embodiment makes contact with an obstacle on a road, for example, an external force applied to the spoiler member 20 is input to each first engagement member 61 via the connection link 35 serving as a support member of the spoiler member 20. At this time, the first engagement member 61 that is pressed against the second engagement member 62 by the biasing force of the coil spring 43 moves relative to the second engagement member 62 in the axial direction against the biasing force of the coil spring 43, and the engagement surfaces S1 and S2 of the first and second engagement members 61 and 62 slide on each other in the circumferential direction. The relative rotation between the first engagement member 61 and the second engagement member 62 is permitted accordingly. The spoiler member 20 rotates about the driven shaft P4 serving as the pivot shaft of the spoiler member 20 in a state where the external force input to the spoiler member 20 is inhibited from being transmitted to the link mechanism 30 (see FIGS. 7 and 8).

Figure 11:
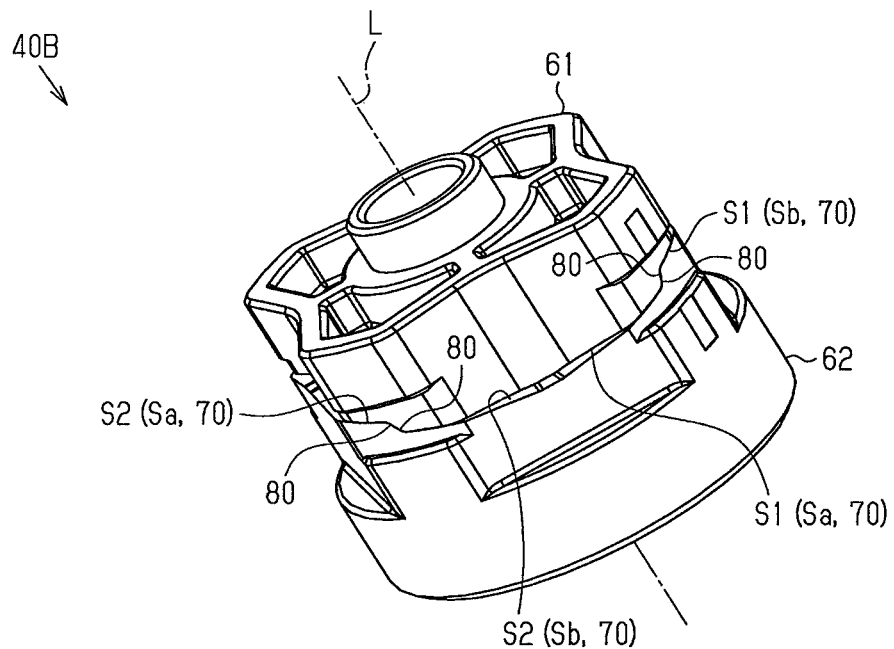
FIG. 11 is a perspective view of a clutch mechanism according to a second embodiment.
Figure 12:
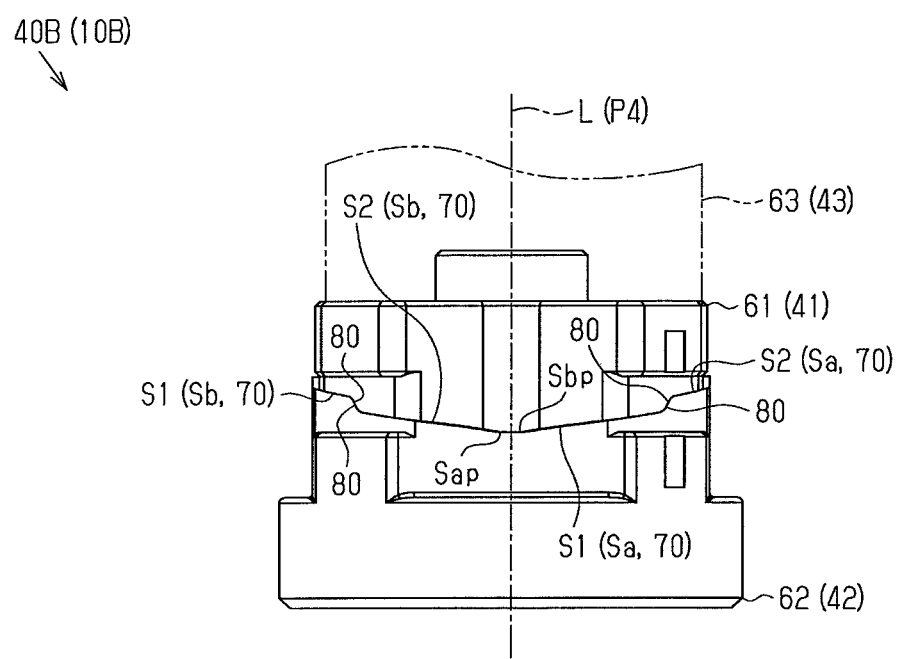
FIG. 12 is a side view of the clutch mechanism according to the second embodiment.
Figure 13:
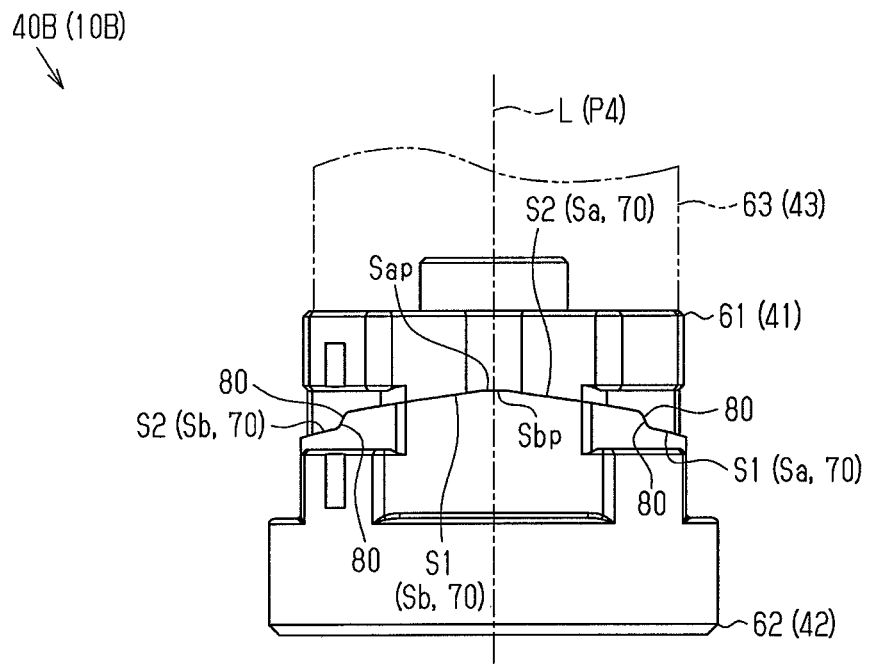
FIG. 13 is a side view of the clutch mechanism according to the second embodiment.
Figure 14:
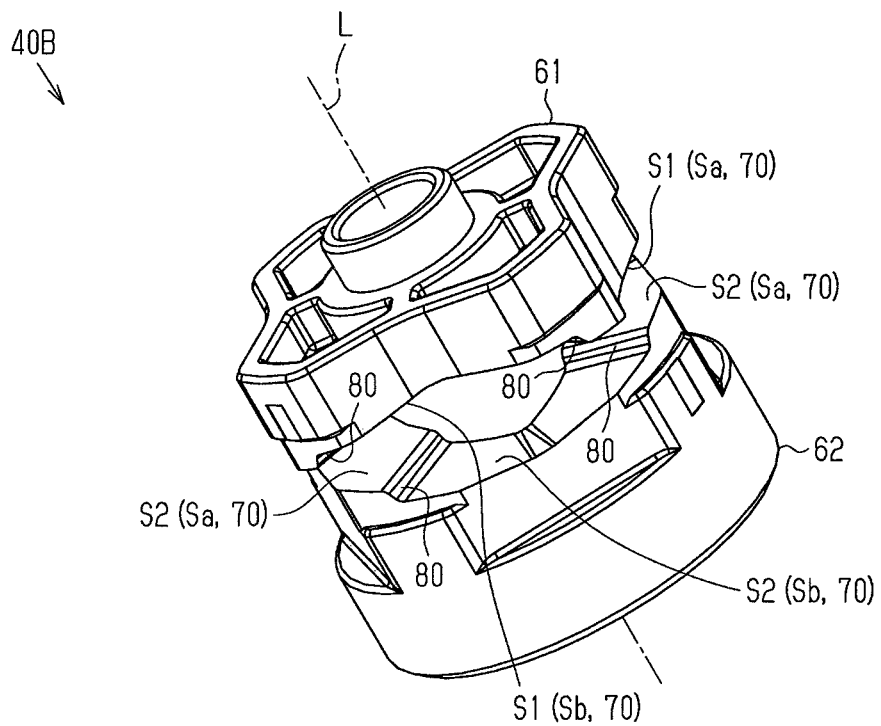
FIG. 14 is a perspective view of the clutch mechanism according to the second embodiment.
Figure 15:
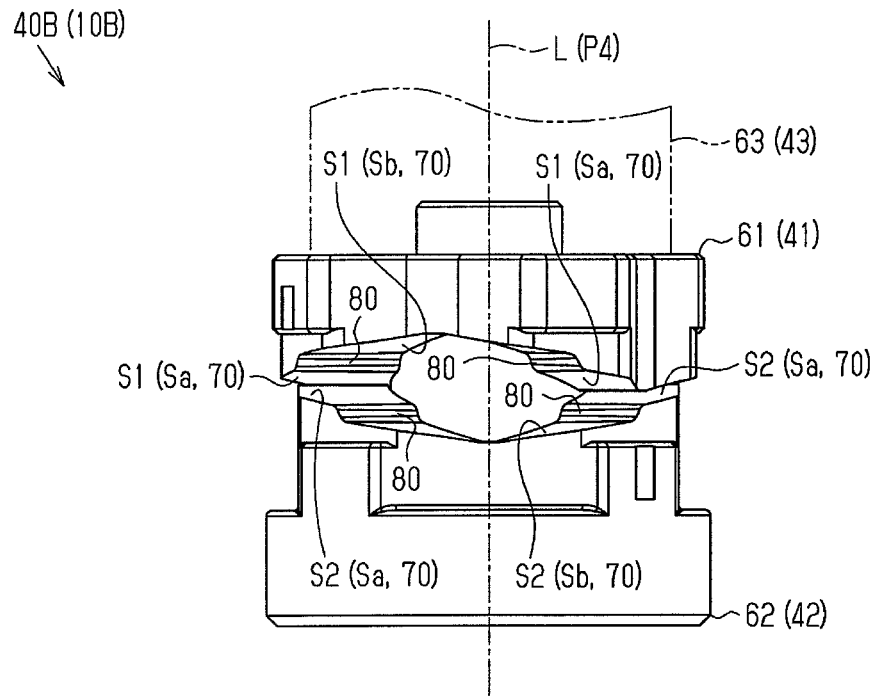
FIG. 15 is a side view of the clutch mechanism according to the second embodiment.
Figure 25:
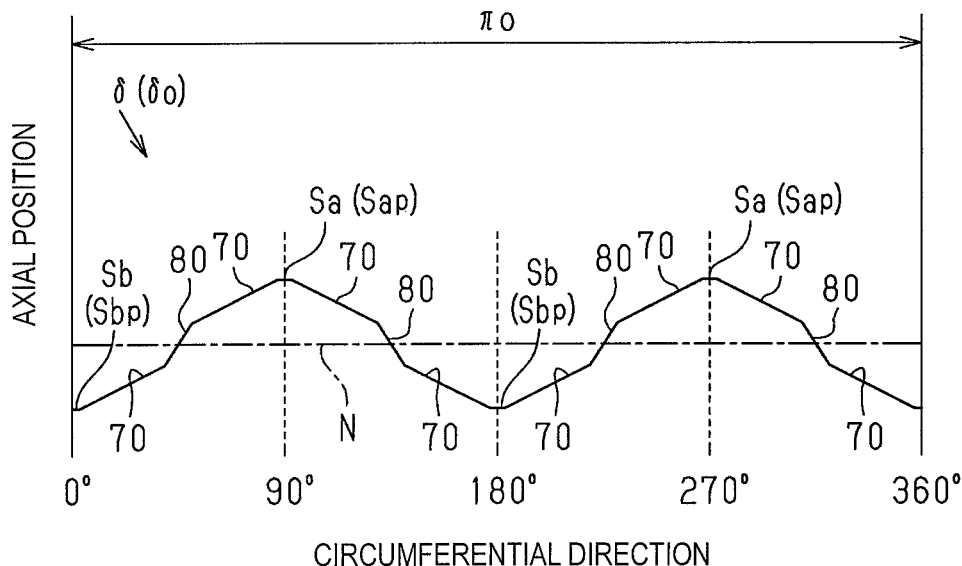
FIG. 25 is an explanatory view of an up-and-down configuration specified at each engagement surface of the first engagement member and the second engagement member according to the second embodiment.

Specifically, as illustrated in FIGS. 17 to 25, an up-and-down configuration (a crest and trough shape) δ in a substantially triangular waveform (see FIGS. 19 and 20) is specified at each of the engagement surfaces S1 and S2 of the first and second engagement members 61 and 62 along a circumferential direction thereof. Specifically, in a case where an axis of symmetry is specified at an apex Sap of the bulge portion Sa or at a bottom Sbp of the recess portion Sb, each bulge portion Sa or each recess portion Sb constituting the up-and-down configuration δ is symmetrical in the circumferential direction. Additionally, the engagement surfaces S1 and S2 of the first and second engagement members 61 and 62 include substantially the same up-and-down configurations 8. Specifically, the bulge portions Sa and the recess portions Sb of the up-and-down configuration δ of the engagement surface S1 are respectively meshed with the recess portions Sb and the bulge portions Sa of the up-and-down configuration δ of the engagement surface S2 in a state where the up-and-down configurations 8 of the engagement surfaces S1 and S2 are opposed to each other in the axial direction and displaced in the circumferential direction. In FIG. 25, for purposes of explanation, the up-and-down configuration δ of each of the engagement surfaces S1 and S2 of the first and second engagement members 61 and 62 is illustrated with a single graph where the bulge portions Sa are specified at an upper part protruding upward than an intermediate line N and the recess portions Sb are specified at a lower part protruding downward than the intermediate line N. The clutch mechanism 40B of the second embodiment is configured to return to the meshed state where the bulge portions Sa and the recess portions Sb of the engagement surface S1 are respectively meshed with the recess portions Sb and the bulge portions Sa of the engagement surface S2 as illustrated in FIGS. 11 to 13 from an unmeshed state (i.e., a state where the meshed state is released) where the bulge portions Sa of the engagement surface S1 and the bulge portions Sa of the engagement surface S2 are positioned onto (i.e., ride over) each other as illustrated in FIGS. 14 to 16 in accordance with the up-and-down configurations 6 of the engagement surfaces S1 and S2 and the biasing force of the biasing member 63.

Figure 4:
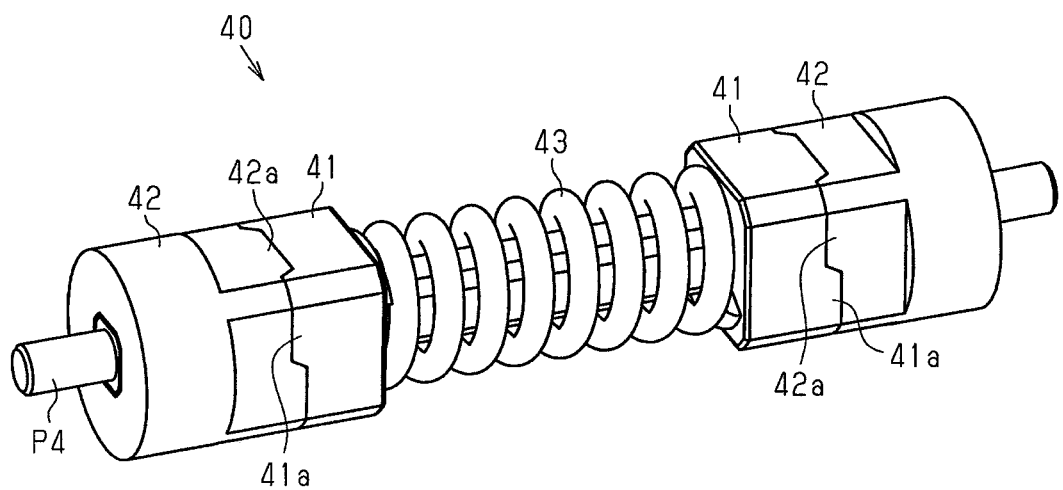
FIG. 4 is a perspective view of a clutch mechanism used in the movable spoiler device according to the first embodiment.
Figure 5:
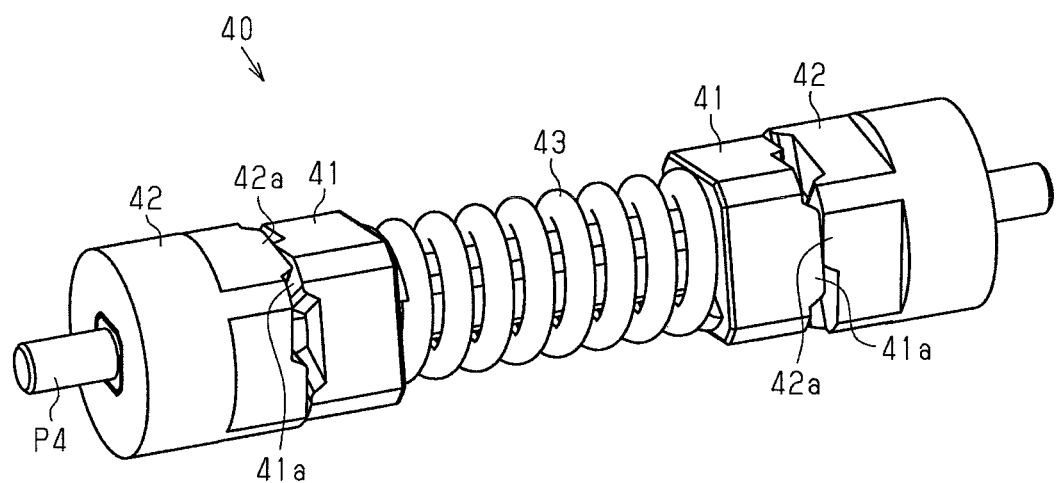
FIG. 5 is a perspective view of the clutch mechanism used in the movable spoiler device according to the first embodiment.
Figure 26:
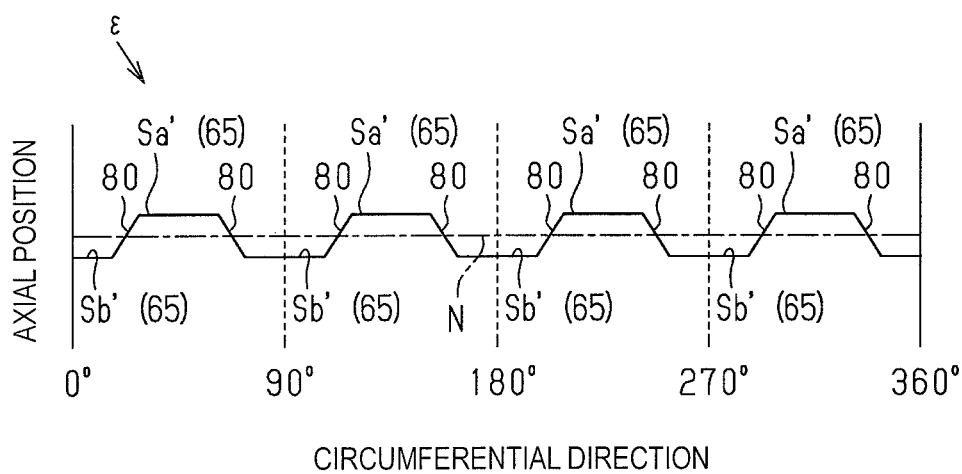
FIG. 26 is an explanatory view of an up-and-down configuration specified at each engagement surface according to the first embodiment.

In the first embodiment as illustrated in FIGS. 4, 5, and 26, an up-and-down configuration ε in a substantially trapezoid waveform is specified at each of engagement surfaces S1' and S2' of the inner engagement member 41 and the outer engagement member 42 along a circumferential direction thereof, the inner engagement member 41 and the outer engagement member 42 corresponding to the first engagement member 61 and the second engagement member 62 respectively. Each of the engagement surfaces S1' and S2' of the inner engagement member 41 and the outer engagement member 42 includes flat surfaces 65 at an apex of each bulge portion Sa' and a bottom of each recess portion Sb' respectively. In FIG. 26, for purposes of explanation, the up-and-down configurations of each of the engagement surfaces S1' and S2' of the inner engagement member 41 and the outer engagement member 42 is illustrated with a single graph where the bulge portions Sa' are specified at an upper part protruding upward than the intermediate line N and the recess portions Sb' are specified at a lower part protruding downward than the intermediate line N. In a case where the bulge portions Sa' of the engagement surface S1' of the inner engagement member 41 and the bulge portions Sa' of the engagement surface S2' of the outer engagement member 42 are positioned onto each other so that the unmeshed state is established (see FIG. 5), such unmeshed state is maintained by the flat surfaces 65 formed at the apexes of the bulge portions Sa' of the engagement surfaces S1' and S2' being pressed against each other in the axial direction. In the movable spoiler device 10 of the first embodiment, the outer engagement members 42 are driven to rotate by the operation of the actuator (see FIGS. 8 and 9) so that the unmeshed state is shifted to the meshed state where the bulge portions Sa' and the recess portions Sb' of the engagement surface S1' are respectively meshed with the recess portions Sb' and the bulge portions Sa' of the engagement surface S2' (see FIG. 4). The further operation of the actuator from the aforementioned state brings the spoiler member 20 that has moved by the external force to the retracted position to return to the deployed position.

On the other hand, according to the clutch mechanism 40B of the second embodiment as illustrated in FIGS. 17 to 24, inclined surfaces 70 are provided at each of the engagement surfaces S1 and S2 of the first and second engagement members 61 and 62 to form the up-and-down configuration δ in the substantially triangular waveform.

Figure 16:
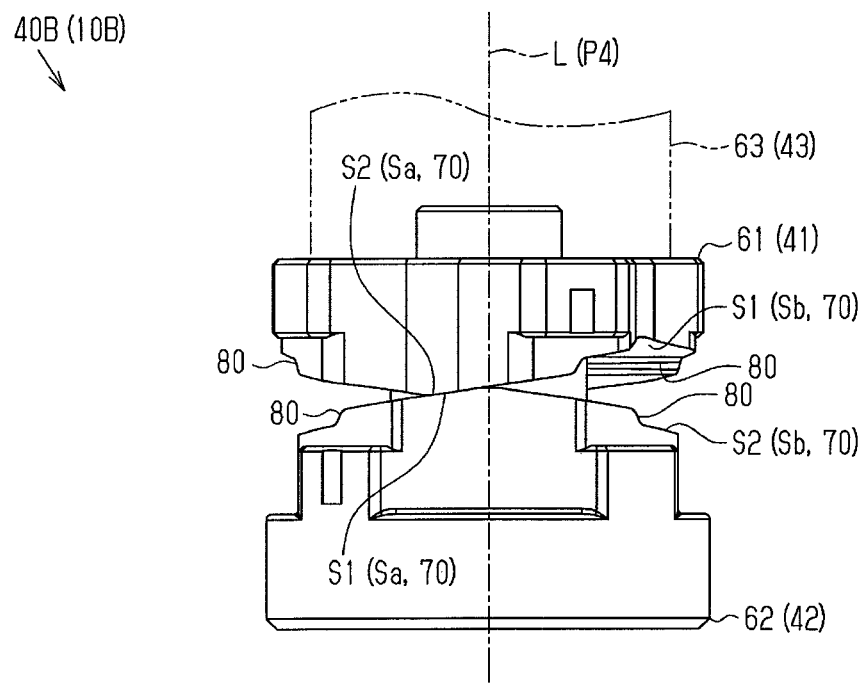
FIG. 16 is a side view of the clutch mechanism according to the second embodiment.
Figure 17:
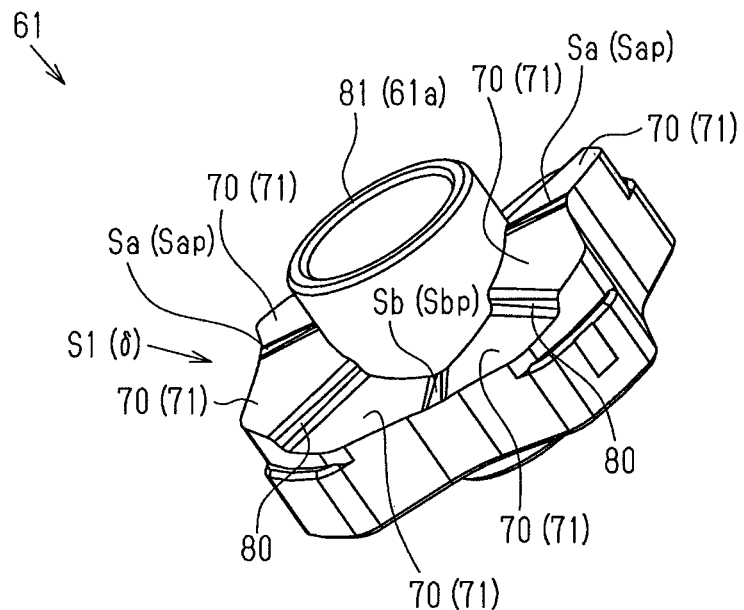
FIG. 17 is a perspective view of a first engagement member according to the second embodiment.
Figure 18:
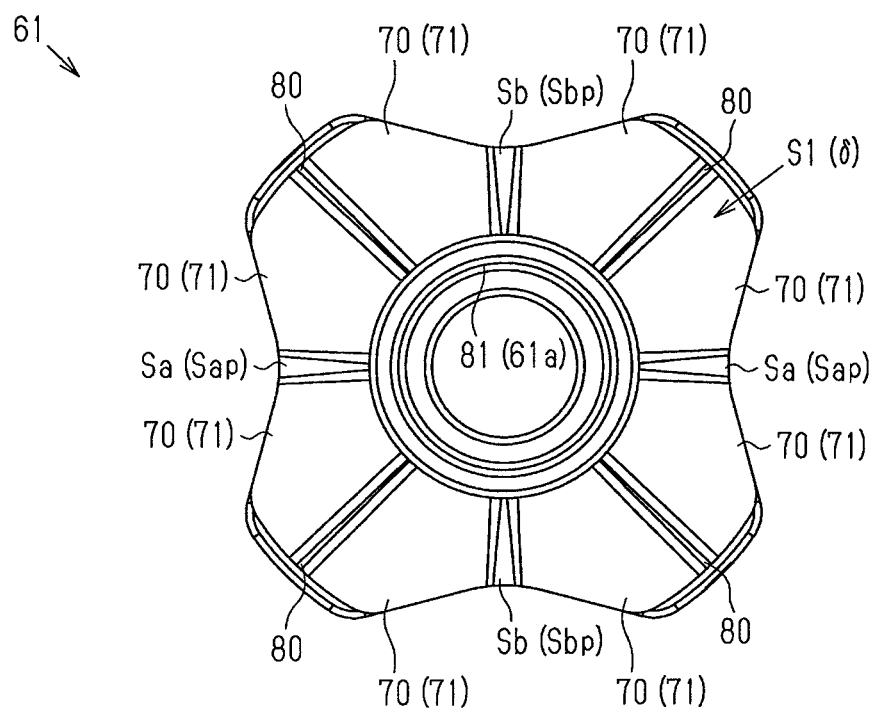
FIG. 18 is a front view of the first engagement member according to the second embodiment.
Figure 19:
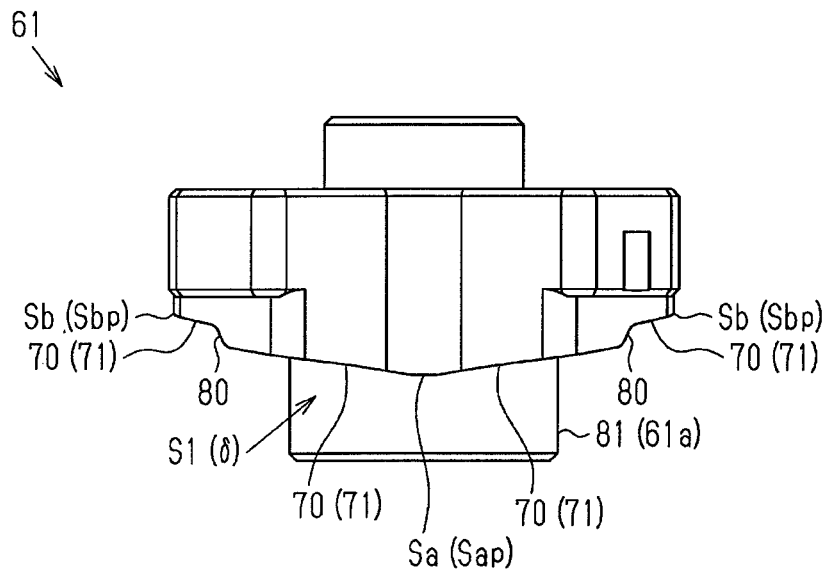
FIG. 19 is a side view of the first engagement member according to the second embodiment.
Figure 20:
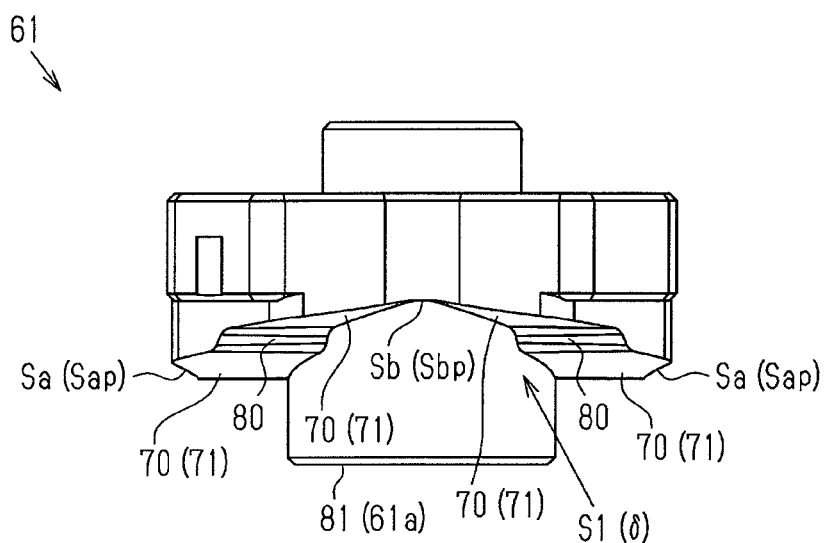
FIG. 20 is a perspective view of a second engagement member according to the second embodiment.
Figure 21:
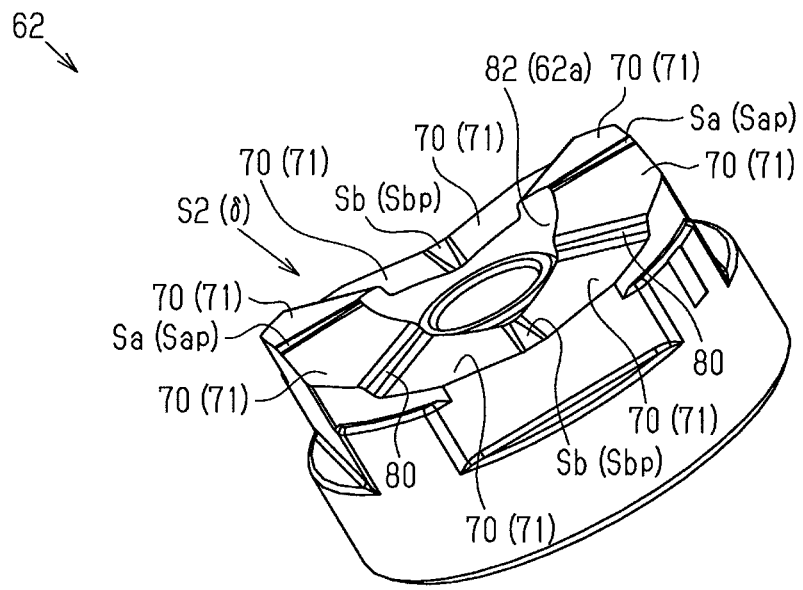
FIG. 21 is a front view of the second engagement member according to the second embodiment.
Figure 22:
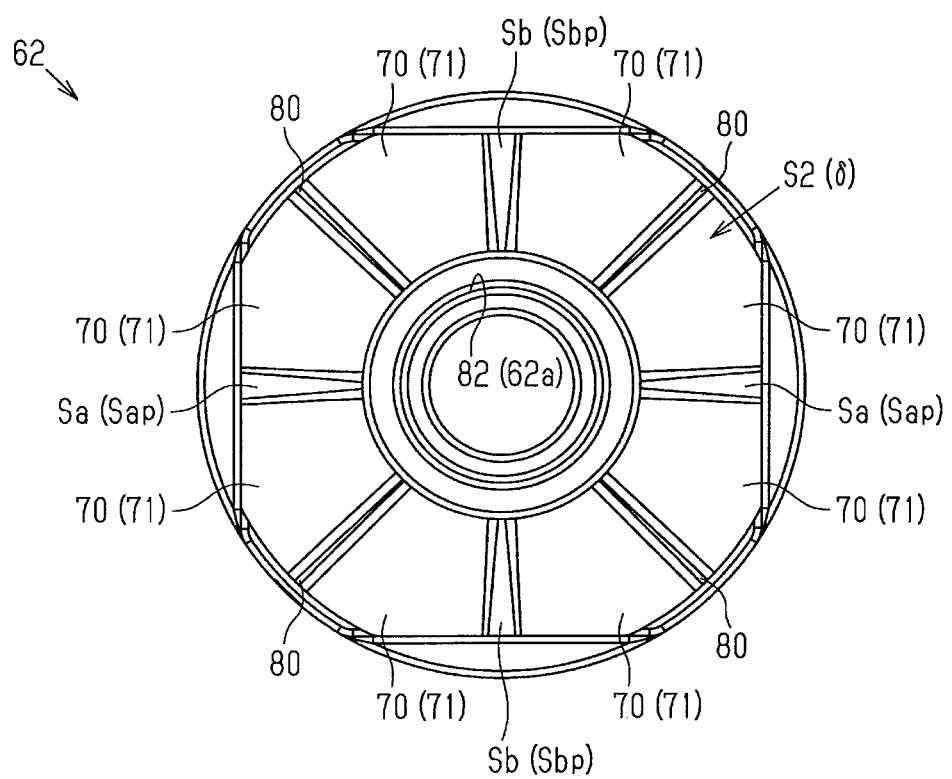
FIG. 22 is a front view of the second engagement member according to the second embodiment.
Figure 23:
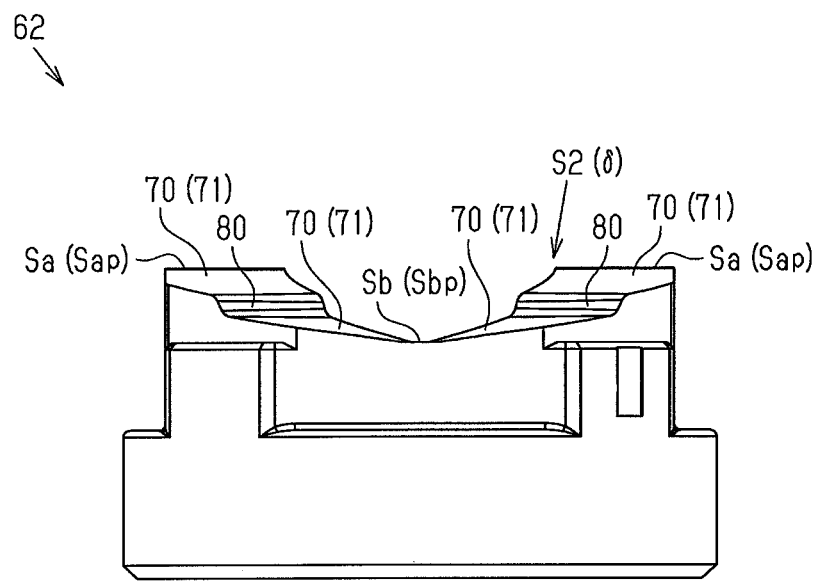
FIG. 23 is a side view of the second engagement member according to the second embodiment.
Figure 24:
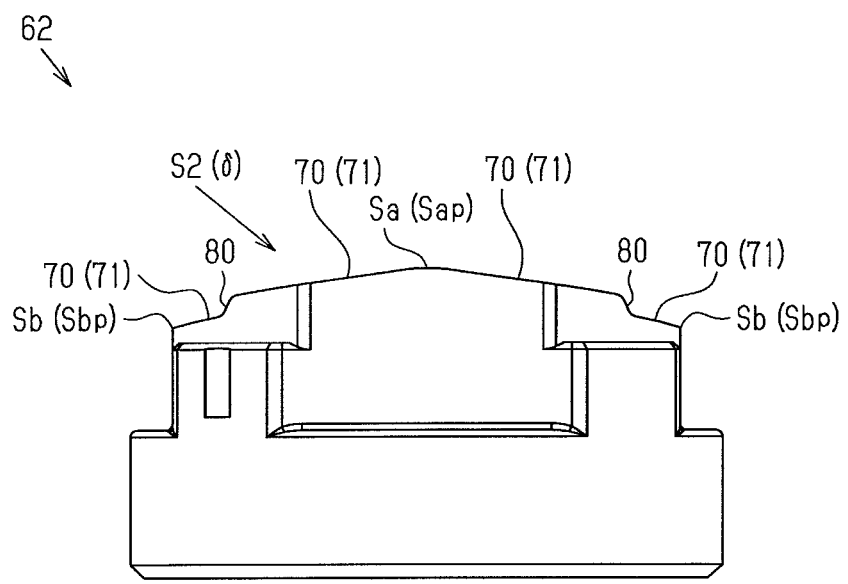
FIG. 24 is a side view of the second engagement member according to the second embodiment.
Figure 27:
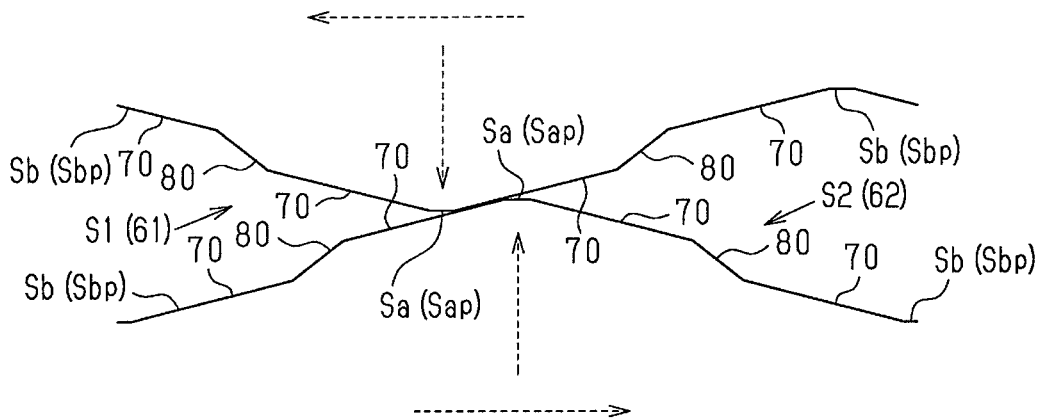
FIG. 27 is a schematic view illustrating an unmeshed state where bulge portions of the respective engagement surfaces are positioned onto each other and illustrating inclined surfaces provided at the bulge portions of the respective engagement surfaces to slide on each other.

As illustrated in FIGS. 16 and 27, the engagement surfaces S1 and S2 of the clutch mechanism 40B of the second embodiment are brought to the unmeshed state where the bulge portions Sa of the engagement surfaces S1 and S2 are positioned onto each other while the inclined surfaces 70 provided at the respective bulge portions Sa of the engagement surfaces S1 and S2 are slidably in contact with each other.

Specifically, disappearance of the external force that has brought the engagement surfaces S1 and S2 to the unmeshed state, i.e., disappearance of the external force applied to the spoiler member 20, causes the inclined surfaces 70 of the engagement surfaces S1 and S2 sliding on each other to be pressed against each other in the axial direction in accordance with the biasing force of the biasing member 63. The engagement surfaces S1 and S2 moving relative to each other in the axial direction slide in the circumferential direction at the respective inclined surfaces 70 in response to the aforementioned pressing force in the axial direction. The first engagement member 61 and the second engagement member 62 come closer to each other in the axial direction while rotating in opposite directions from each other. The engagement surfaces S1 and S2 thus return to the meshed state where the bulge portions Sa and the recess portions Sb of the engagement surface S1 are respectively meshed with the recess portions Sb and the bulge portions Sa of the engagement surface S2.

In the movable spoiler device 10B of the second embodiment, the spoiler member 20 that has moved to the retracted position (see FIG. 8) by the application of the external force returns to the deployed position (see FIG. 7) by the biasing force of the biasing member 63 provided at the clutch mechanism 40B using the function of the clutch mechanism 40B that recovers the meshed state, without the operation of the actuator. The construction of the movable spoiler device 10B including the actuator control is simplified accordingly.

The inclined surfaces 70 provided at the engagement surfaces S1 and S2 in the clutch mechanism 40B include helical surfaces 71 helically curving and extending around the rotation axis L of each of the first and second engagement members 61 and 62 as illustrated in FIGS. 17 to 24.

Figure 28:
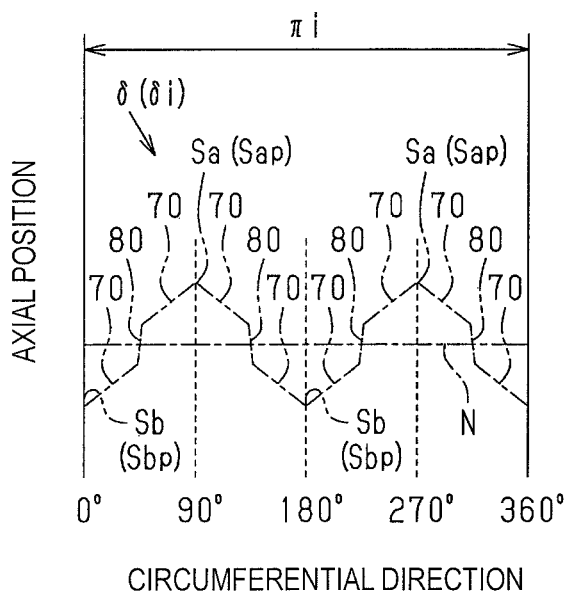
FIG. 28 is an explanatory view of an up-and-down configuration specified at each engagement surface of the first engagement member and the second engagement member according to the second embodiment.
Figure 29:
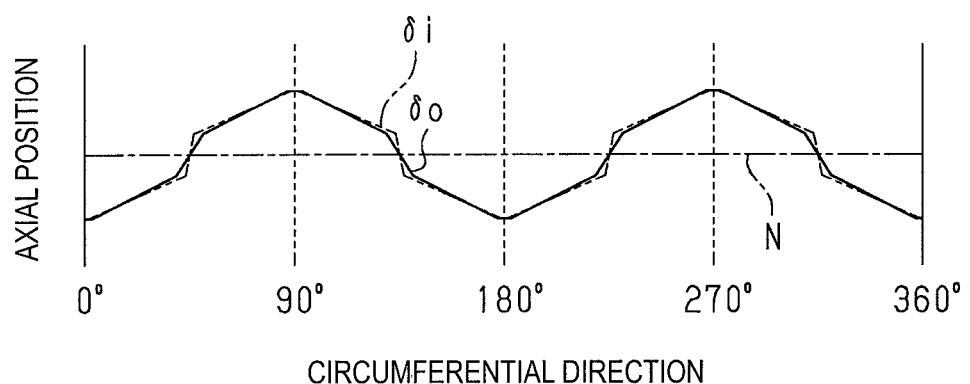
FIG. 29 is a comparison view of up-and-down configurations specified at an inner circumferential part and an outer circumferential part of each engagement surface according to the second embodiment.

Specifically, as illustrated in FIGS. 25, 28, and 29, each of the engagement surfaces S1 and S2 of the first and second engagement members 61 and 62 includes an up-and-down configuration δo at an outer circumferential part and an up-and-down configuration δi at an inner circumferential part, the up-and-down configuration δo and the up-and-down configuration δi including different lengths from each other, i.e., lengths πo and πi. An axial position of any point in the up-and-down configuration δi and an axial position of any point in the up-and-down configuration δo vary in substantially the same manner as long as such points are at the same angular position in the circumferential direction. The up-and-down configuration δo provided at the outer circumferential part of each of the engagement surfaces S1 and S2 and the up-and-down configuration δi provided at the inner circumferential part of each of the engagement surfaces S1 and S2 are continuously formed in a radial direction at each of the engagement surfaces S1 and S2. That is, each of the engagement surfaces S1 and S2 includes the up-and-down configuration δ where axial positions of any points in the radial direction vary in substantially the same manner as long as such points are at the same angular position in the circumferential direction.

Figure 30:
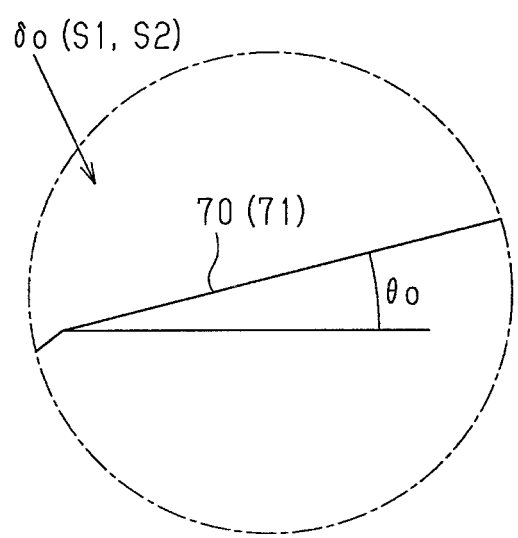
FIG. 30 is a diagram illustrating an inclined angle of the inclined surface at the outer circumferential part of each engagement surface according to the second embodiment.
Figure 31:
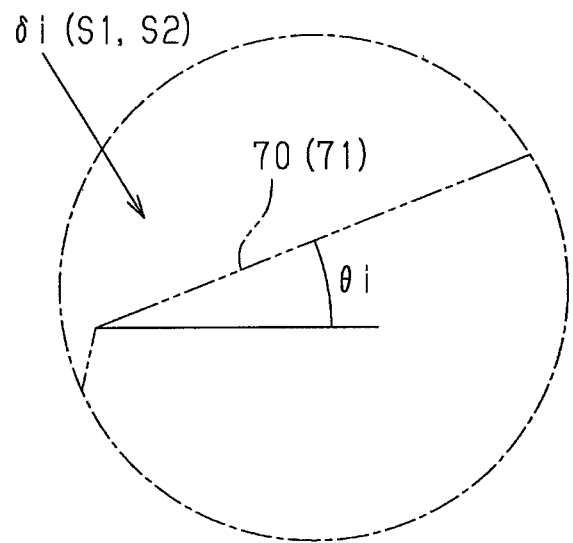
FIG. 31 is a diagram illustrating an inclined angle of the inclined surface at the inner circumferential part of each engagement surface according to the second embodiment.
Figure 32:
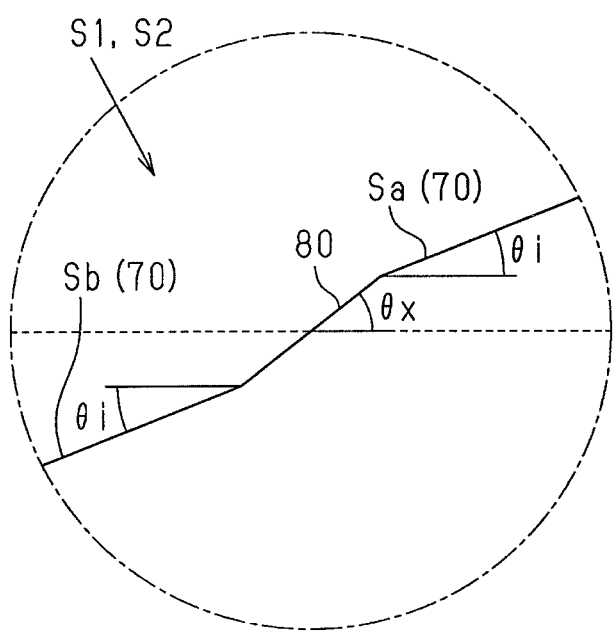
FIG. 32 is a diagram illustrating a stepped portion provided at a boundary between the bulge portion and the recess portion according to the second embodiment.

As illustrated in FIGS. 30 and 31, each inclined surface 70 provided at each of the engagement surfaces S1 and S2 of the first and second engagement members 61 and 62 includes an inclined angle θi at the inner circumferential part and an inclined angle θo at the outer circumferential part, the inclined angle θi being greater than the inclined angle θo.

The inclined surfaces 70 serving as the helical surfaces 71 are provided at each of the engagement surfaces S1 and S2 of the first and second engagement members 61 and 62, so that a contact state (i.e., a surface contact state) between the inclined surfaces 70 of the engagement surface S1 and the inclined surfaces 70 of the engagement surface S2 sliding on each other is maintained while the engagement surfaces S1 and S2 are sliding on each other in the circumferential direction. The clutch mechanism 40B of the second embodiment ensures stable operation accordingly.

As illustrated in FIGS. 17 to 24 and 32, each of the engagement surfaces S1 and S2 of the first and second engagement members 61 and 62 includes stepped portions 80 each of which is provided at a boundary between the bulge portion Sa and the recess portion Sb. The stepped portion 80 includes an inclined angle θx greater than the inclined angle θi of the inclined surface 70 defining each of the bulge portion Sa and the recess portion Sb.

As illustrated in FIGS. 11 to 13, the stepped portion 80 provided at the engagement surface S1 of the first engagement member 61 and the stepped portion 80 provided at the engagement surface S2 of the second engagement member 62 engage with each other in the circumferential direction in the meshed state where the bulge portions Sa and the recess portions Sb of the engagement surface S1 are respectively meshed with the recess portions Sb and the bulge portions Sa of the engagement surfaces S2. The clutch mechanism 40B of the second embodiment is constructed so that the holding torque in the meshed state, i.e., the driving force of the actuator that is transmittable to the spoiler member 20 via the clutch mechanism 40B, and the external force holding the spoiler member 20 at the deployed position are enlarged.

Figure 33:
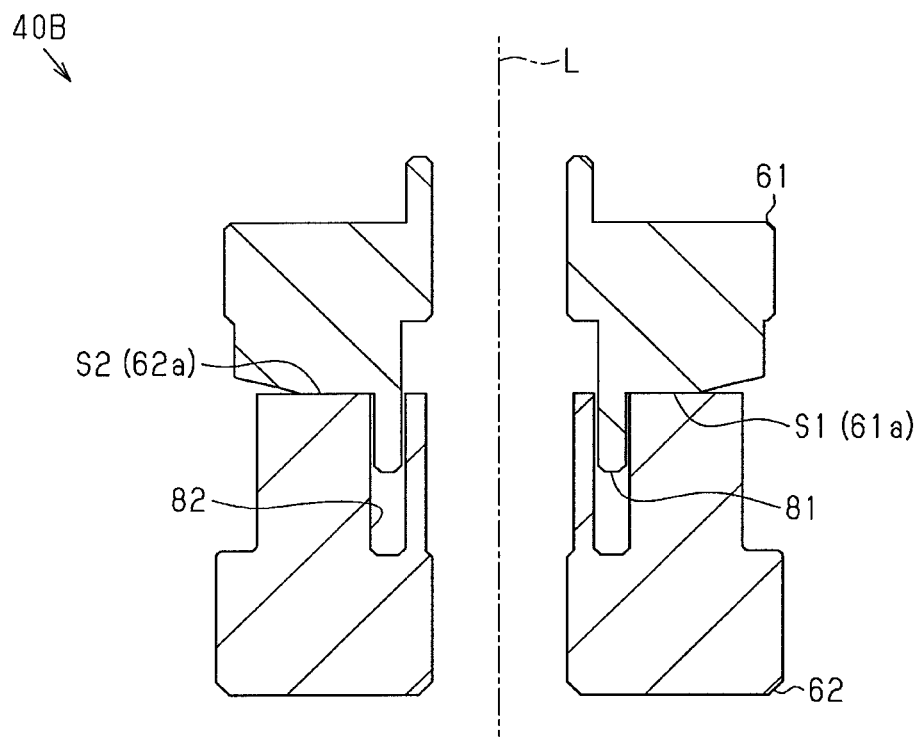
FIG. 33 is a cross-sectional view of the clutch mechanism according to the second embodiment.

As illustrated in FIG. 33, the first engagement member 61 includes a cylindrical projection 81 at an axial end portion 61a where the engagement surface S1 is provided. The second engagement member 62 includes an annular groove 82 that is recessed at an axial end portion 62a where the engagement surface S2 is provided. The first and second engagement members 61 and 62 are coaxially arranged with each other in a state where the cylindrical projection 81 is fitted to be positioned within the annular groove 82. The first and second engagement members 61 and 62 are thus relatively rotatable and relatively movable in the axial direction in smooth and stable manner.

Effects of the second embodiment are explained below.

(1) According to the second embodiment, the clutch mechanism 40B includes the first engagement member 61 and the second engagement member 62 coaxially arranged with each other, each of the first engagement member 61 and the second engagement member 62 including the engagement surface S1, S2 where the bulge portion Sa and the recess portion Sb are alternately and continuously arranged in the circumferential direction of the clutch mechanism 40B, the engagement surface S1 of the first engagement member 61 and the engagement surface S2 of the second engagement member 62 facing each other in the axial direction of the clutch mechanism 40B. The clutch mechanism 40B also includes the biasing member 63 provided adjacent to the first engagement member 61 and the second engagement member 62 in the axial direction and generating the biasing force in the axial direction to engage the engagement surface S1 of the first engagement member 61 and the engagement surface S2 of the second engagement member 62 with each other. The first engagement member 61 and the second engagement member 62 are restricted from rotating relative to each other by the engagement between the engagement surface S1 of the first engagement member 61 and the engagement surface S2 of the second engagement member 62 in a state where the bulge portion Sa and the recess portion Sb provided at the engagement surface S1 of the first engagement member 61 and the recess portion Sb and the bulge portion Sa provided at the engagement surface S2 of the second engagement member 62 are respectively meshed with each other in the axial direction. The first engagement member 61 and the second engagement member 62 are allowed to rotate relative to each other in accordance with the external force in a state where the respective engagement surfaces S1 and S2 of the first engagement member 61 and the second engagement member 62 slide on each other in the circumferential direction while moving relative to each other in the axial direction against the biasing force of the biasing member 63.

The clutch mechanism 40B thus transmits the drive force of the actuator to the spoiler member 20 and interrupts the transmission of the external force applied to the spoiler member 20 with a simplified construction.

(2) The engagement surfaces S1 and S2 of the first engagement member 61 and the second engagement member 62 include the inclined surfaces 70 that cause the engagement surfaces S1 and S2 of the first engagement member 61 and the second engagement member 62 to return from the unmeshed state where the bulge portions Sa of the first engagement member 61 and the second engagement member 62 are positioned onto each other by the engagement surfaces S1 and S2 of the first engagement member 61 and the second engagement member 62 sliding on each other in the circumferential direction while moving relative to each other in the axial direction against the biasing force of the biasing member 63 to the meshed state where the bulge portion Sa and the recess portion Sb provided at the engagement surface S1 of the first engagement member 61 and the recess portion Sb and the bulge portion Sa provided at the engagement surface S2 of the second engagement member 61 are respectively meshed with each other by the engagement surfaces S1 and S2 of the first engagement member 61 and the second engagement member 62 sliding on each other in the circumferential direction while moving relative to each other in the axial direction in accordance with the biasing force of the biasing member 63.

In a case where the external force applied to the spoiler member 20 disappears, the biasing force of the biasing member 63 provided at the clutch mechanism 40B is utilized, instead of the operation of the actuator, so as to return the spoiler member 20 that has moved to the retraction position by the aforementioned external force to the deployed position. The construction of the movable spoiler device 10B including the actuator control is simplified accordingly.

(3) Each of the inclined surfaces 70 serve as the helical surface 71 helically curving and extending with reference to a rotation axis of each of the first engagement member 61 and the second engagement member 62.

The inclined surfaces 70 of the engagement surfaces S1 and S2 of the first and second engagement members 61 and 62 slidably in contact with each other maintain the surface contact state while the engagement surfaces S1 and S2 are sliding in the circumferential direction. The stable operation of the clutch mechanism 40B is thus secured.

(4) Each of the engagement surfaces S1 and S2 of the first engagement member 61 and the second engagement member 62 includes the stepped portion 80 that is disposed at a boundary between the bulge portion Sa and the recess portion Sb.

The stepped portions 80 provided at the engagement surface S1 of the first engagement member 61 and the stepped portions 80 provided at the engagement surface S2 of the second engagement member 62 engage with one another in the circumferential direction in a case where the engagement surfaces S1 and S2 are brought to the meshed state where the bulge portions Sa and the recess portions Sb are meshed with one another. The holding torque in the meshed state, i.e., the driving force of the actuator that is transmittable to the spoiler member 20 via the clutch mechanism 40B, and the external force holding the spoiler member 20 at the deployed position are enlarged.

(5) Each of the engagement surfaces S1 and S2 of the first engagement member 61 and the second engagement member 62 includes the up-and-down configuration δ in a triangular waveform along the circumferential direction.

The inclined surfaces 70 that cause the engagement surfaces S1 and S2 to return from the unmeshed state where the bulge portions Sa of the engagement surface S1 and the bulge portions Sa of the engagement surface S2 are positioned onto one another to the meshed state obtained by the sliding movement of the engagement surfaces S1 and S2 in the circumferential direction while the engagement surfaces S1 and S2 are moving relative to each other in the axial direction are achieved with a simplified construction, (6) Each of the engagement surfaces S1 and S2 of the first engagement member 61 and the second engagement member 62 includes the up-and-down configuration δ in a trapezoid waveform along the circumferential direction.

Regardless of the relative rotation directions of the first engagement member 61 and the second engagement member 62, the engagement surfaces S1 and S2 slide in the circumferential direction while relatively moving in the axial direction against the biasing force of the biasing member 63. The relative rotation of the first engagement member 61 and the second engagement member 62 in accordance with the external force applied to the spoiler member 20 is thus allowable. The first engagement member 61 and the second engagement member 62 are thus commonly usable in a construction where the first engagement member 61 and the second engagement member 62 in the first pair and the first engagement member 61 and the second engagement member 62 in the second pair are arranged apart from each other in the axial direction, and the biasing member 63 is disposed between the aforementioned two pairs, for example.

(7) One of the first engagement member 61 and the second engagement member 62 includes the cylindrical projection 81 and the other of the first engagement member 61 and the second engagement member 62 includes the annular groove 82. The first engagement member 61 and the second engagement member 62 are coaxially arranged with each other in a state where the cylindrical projection 81 is fitted to the annular groove 82.

The first and second engagement members 61 and 62 are relatively rotatable and relatively movable in the axial direction in smooth and stable manner.

Each embodiment disclosed here can be modified and implemented as follows. The embodiment disclosed here and the following modification can be implemented in combination with each other as long as they do not have technical contradiction.

In the above embodiment, the clutch mechanism 40 is provided in the driven shaft P4. However, the embodiment disclosed here is not limited to this. That is, the same effect as in (1) of the above embodiment can be obtained by providing the clutch mechanism 40 on a driving force transmission path between the drive shaft P1 of the actuator and the spoiler member 20. In addition, plural clutch mechanisms with different arrangements and types may be provided.

Figure 10:
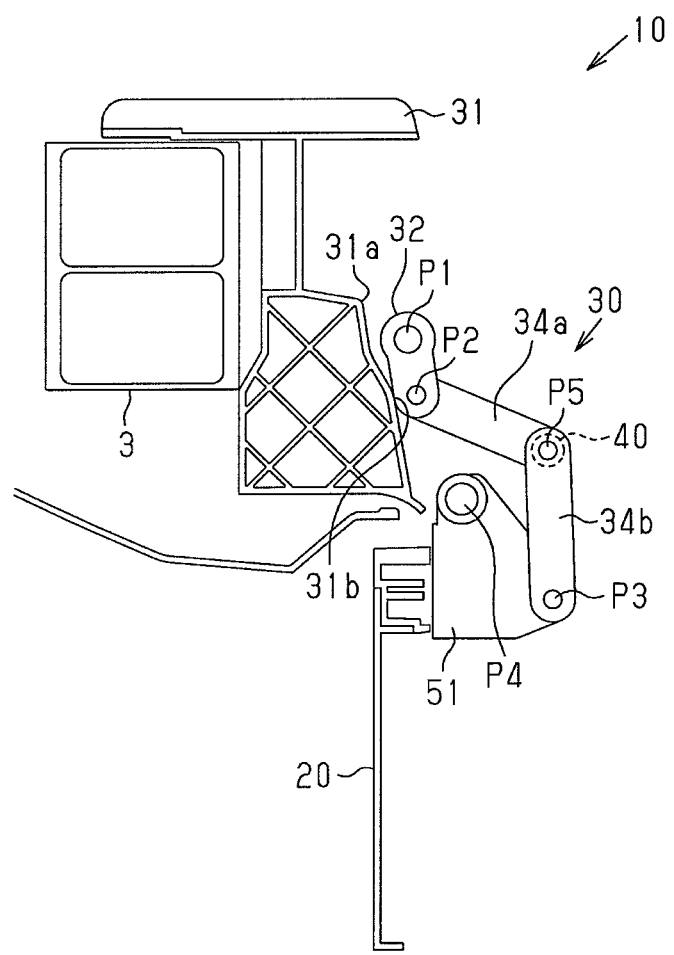
FIG. 10 is a side view illustrating a retracted state of a movable spoiler device according to a modified example.

As illustrated in FIG. 10, the intermediate link 34 may be divided into a first intermediate link 34a and a second intermediate link 34b, and the clutch mechanism 40 is provided in a coupling shaft P5 that connects the first intermediate link 34a and the second intermediate link 34b. In a modified example illustrated in FIG. 10, an end portion of the first intermediate link 34a is connected with the coupling shaft P5, and the other end portion on the opposite side of the first intermediate link 34a is connected with the drive link 32 via the coupling shaft P2. An end portion of the second intermediate link 34b is connected with the coupling shaft P5, and the other end portion on the opposite side of the second intermediate link 34b is connected with a driven link 51 via the coupling shaft P3. The driven link 51 is rotatably connected with the bracket 31 via the driven shaft P4. Further, the driven link 51 is fixed to the spoiler member 20. As a result, the spoiler member 20 is rotated around the driven shaft P4 as the driven link 51 rotates. In this embodiment, the driven shaft P4 and the drive shaft P1 are also rotatably supported by the bracket 31 as in the above embodiment.

In the movable spoiler device 10 configured as described above, the first intermediate link 34a and the second intermediate link 34b are held by the clutch mechanism 40, so that an angle between the first intermediate link 34a and the second intermediate link 34b is formed to be a predetermined angle. Therefore, normally, the first intermediate link 34a and the second intermediate link 34b operate integrally, and the link mechanism 30 functions as a four-joint linkage including the drive link 32, the first intermediate link 34a, the second intermediate link 34b, the driven link 51 and the bracket 31 (fixed link). As a result, similarly to the above embodiment, in the movable spoiler device 10 of this embodiment, the driving force generated by the rotation of the drive shaft P1 is transmitted to the driven link 51 via the drive link 32, the first intermediate link 34a and the second intermediate link 34b. Thus, the driven link 51 is rotated, so that the spoiler member 20 can be rotated between the deployed state and the retracted state. In addition, when an obstacle collides with the spoiler member 20 from the front, the transmission of the driving force (external force) from the side of the spoiler member 20 is blocked by the clutch mechanism 40.

In the above embodiment, a four-joint linkage mechanism is adopted as the link mechanism 30. However, the disclosure is not limited to this, and for example, a link mechanism having five or more nodes may be adopted.

In the above embodiment, the drive shaft P1 is driven from the cancel state, so that the state where the transmission of the driving force is blocked is returned by the clutch mechanism 40 to the state where the driving force can be transmitted, but the disclosure is not limited to this. For example, the spoiler member 20 is rotated clockwise around the driven shaft P4 by the own weight of the spoiler member 20 from the cancel state illustrated in FIG. 8, so that the state where the transmission of the driving force is blocked by the clutch mechanism 40 may be returned to the state where the driving force can be transmitted.

Figure 34:
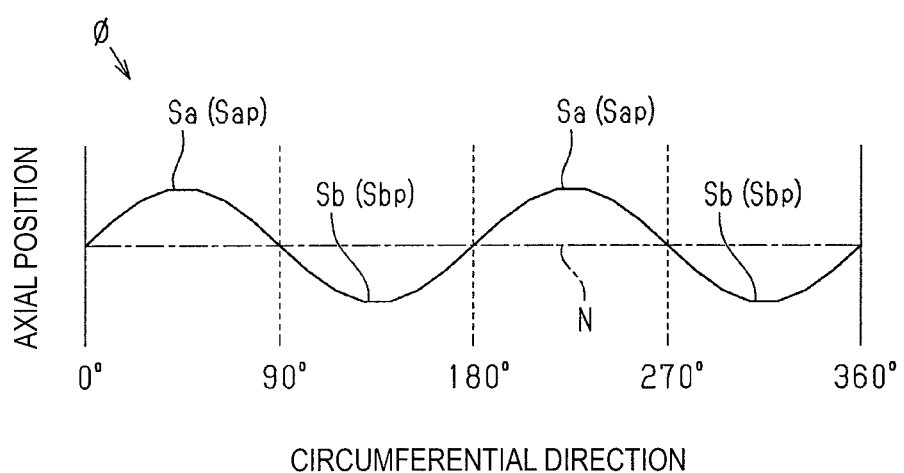
FIG. 34 is an explanatory view of an up-and-down configuration specified at each engagement surface according to another modified example.

In the second embodiment, each of the engagement surfaces S1 and S2 of the first and second engagement members 61 and 62 includes the up-and-down configuration δ in the substantially triangular waveform along the circumferential direction. The up-and-down configuration specified at each of the engagement surfaces S1 and S2 is appropriately changed as long as the relative rotation between the first and second engagement members 61 and 62 is able to be prohibited and is allowable in a manner that the first and second engagement members 61 and 62 are brought to the unmeshed state where the bulge portions Sa thereof are positioned onto each other. For example, an up-and-down configuration φ in a substantially sine waveform such as illustrated in FIG. 34 is employable. Configurations of the bulge portion Sa and the recess portion Sb may be also appropriately changed.

As illustrated in FIG. 26, the up-and-down configurations in the substantially trapezoid waveform arranged along the circumferential direction in the clutch mechanism 40 of the first embodiment include the stepped portions 80 each of which is provided between the bulge portion Sa' and the recess portion Sb'. The stepped portion 80 is defined at an oblique side of each trapezoid in the up-and-down configuration ε. The stepped portion 80 provided at the engagement surface S1' and the stepped portion 80 provided at the engagement surface S2' engage with each other in the circumferential direction to enlarge the holding torque in the meshed state of the engagement surfaces S1' and S2'. In addition, when the bulge portions Sa' of the engagement surfaces S1' and S2' are positioned onto each other so that the engagement surfaces S1' and S2' are shifted to the unmeshed state, the facing flat surfaces 65 provided at apexes of the bulge portions Sa' of the engagement surfaces S1' and S2' are pressed against each other in the axial direction. The aforementioned unmeshed state is stably maintained and held accordingly.

In the second embodiment, the first engagement member 61 includes the cylindrical projection 81 and the second engagement member 62 includes the annular groove 82. Alternatively, the second engagement member 62 may include the cylindrical projection 81 and the first engagement member 61 may include the annular groove 82.

In the first and second embodiments, the biasing member 63 corresponding to the coil spring 43 is disposed between the first engagement members 61 corresponding to the pair of inner engagement members 41 that are away from each other in the axial direction. Any types, arrangements, and biasing methods may be employed for the biasing member 63.

According to the embodiments, the movable spoiler device includes the up-and-down configuration being symmetric in the circumferential direction.

The engagement surfaces S1 and S2 slide on each other in the circumferential direction while moving relative to each other in the axial direction against the biasing force of the biasing member 63 regardless of the relative rotation directions of the first engagement member 61 and the second engagement member 62. The relative rotation between the first engagement member 61 and the second engagement member 62 in accordance with the external force applied to the spoiler member 20 is permitted. The first engagement member 61 and the second engagement member 62 are thus commonly usable in a construction, for example, where the first pair of the first engagement member 61 and the second engagement member 62 and the second pair of the first engagement member 61 and the second engagement member 62 are arranged apart from each other in the axial direction, and the biasing member 63 is disposed between the aforementioned two pairs.

According to the aforementioned movable spoiler device 10, 10B, the external force applied on the spoiler member 20, 20B can be well absorbed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A movable spoiler device provided in a front part of a vehicle body, the movable spoiler device comprising:
   a link mechanism in which a plurality of links are, coupled and configured to operate by driving the links by an actuator;
   a spoiler member connected with one of the plurality of links and being deployable and retractable with respect to the vehicle body by operation of the link mechanism; and
   a clutch mechanism provided on a driving force transmission path between the actuator and the spoiler member, and configured to block transmission of a driving force when an external force equal to or greater than a predetermined value is applied to the spoiler member with the spoiler member being in a deployed state,
   wherein the clutch mechanism is provided in the link mechanism on a coupling shaft that couples a spoiler fixing link to which the spoiler member is fixed, with a coupling link coupled to the spoiler fixing link.

2. The movable spoiler device according to claim 1, wherein
   the clutch mechanism includes a first engagement member and a second engagement member coaxially arranged with each other, each of the first engagement member and the second engagement member including an engagement surface where a bulge portion and a recess portion are alternately and continuously arranged in a circumferential direction of the clutch mechanism, the engagement surface of the first engagement member and the engagement surface of the second engagement member facing each other in an axial direction of the clutch mechanism,
   the clutch mechanism includes a biasing member provided adjacent to the first engagement member and the second engagement member in the axial direction and generating a biasing force in the axial direction to engage the engagement surface of the first engagement member and the engagement surface of the second engagement member with each other, the first engagement member and the second engagement member are restricted from rotating relative to each other by the engagement between the engagement surface of the first engagement member and the engagement surface of the second engagement member in a state where the bulge portion and the recess portion provided at the engagement surface of the first engagement member and the recess portion and the bulge portion provided at the engagement surface of the second engagement member are respectively meshed with each other in the axial direction, the first engagement member and the second engagement member are allowed to rotate relative to each other in accordance with the external force in a state where the respective engagement surfaces of the first engagement member and the second engagement member slide on each other in the circumferential direction while moving relative to each other in the axial direction against the biasing force of the biasing member.

3. The movable spoiler device according to claim 2, wherein
the engagement surfaces of the first engagement member and the second engagement member include inclined surfaces that cause the engagement surfaces of the first engagement member and the second engagement member to return from an unmeshed state where the bulge portions of the first engagement member and the second engagement member are positioned onto each other by the engagement surfaces of the first engagement member and the second engagement member sliding on each other in the circumferential direction while moving relative to each other in the axial direction against the biasing force of the biasing member to a meshed state where the bulge portion and the recess portion provided at the engagement surface of the first engagement member and the recess portion and the bulge portion provided at the engagement surface of the second engagement member are respectively meshed with each other by the engagement surfaces of the first engagement member and the second engagement member sliding on each other in the circumferential direction while moving relative to each other in the axial direction in accordance with the biasing force of the biasing member.

4. The movable spoiler device according to claim 3, wherein
each of the inclined surfaces serve as a helical surface helically curving and extending with reference to a rotation axis of each of the first engagement member and the second engagement member.

5. The movable spoiler device according to claim 2, wherein
each of the engagement surfaces of the first engagement member and the second engagement member includes a stepped portion that is disposed at a boundary between the bulge portion and the recess portion.

6. The movable spoiler device according to claim 2, wherein
each of the engagement surfaces of the first engagement member and the second engagement member includes an up-and-down configuration in a triangular waveform along the circumferential direction.

7. The movable spoiler device according to claim 2, wherein
each of the engagement surfaces of the first engagement member and the second engagement member includes an up-and-down configuration in a trapezoid waveform along the circumferential direction.

8. The movable spoiler device according to claim 1, wherein
the link mechanism is a four-joint linkage mechanism.

9. A movable spoiler device provided in a front part of a vehicle body, the movable spoiler device comprising:
a link mechanism in which a plurality of links are, coupled and configured to operate by driving the links by an actuator;
a spoiler member connected with one of the plurality of links and being deployable and retractable with respect to the vehicle body by operation of the link mechanism; and
a clutch mechanism provided on a driving force transmission path between the actuator and the spoiler member, and configured to block transmission of a driving force when an external force equal to or greater than a predetermined value is applied to the spoiler member with the spoiler member being in a deployed state, wherein
the clutch mechanism includes a first engagement member and a second engagement member coaxially arranged with each other, each of the first engagement member and the second engagement member including an engagement surface where a bulge portion and a recess portion are alternately and continuously arranged in a circumferential direction of the clutch mechanism, the engagement surface of the first engagement member and the engagement surface of the second engagement member facing each other in an axial direction of the clutch mechanism,
the clutch mechanism includes a biasing member provided adjacent to the first engagement member and the second engagement member in the axial direction and generating a biasing force in the axial direction to engage the engagement surface of the first engagement member and the engagement surface of the second engagement member with each other,
the first engagement member and the second engagement member are restricted from rotating relative to each other by the engagement between the engagement surface of the first engagement member and the engagement surface of the second engagement member in a state where the bulge portion and the recess portion provided at the engagement surface of the first engagement member and the recess portion and the bulge portion provided at the engagement surface of the second engagement member are respectively meshed with each other in the axial direction,
the first engagement member and the second engagement member are allowed to rotate relative to each other in accordance with the external force in a state where the respective engagement surfaces of the first engagement member and the second engagement member slide on each other in the circumferential direction while moving relative to each other in the axial direction against the biasing force of the biasing member,
one of the first engagement member and the second engagement member includes a cylindrical projection,
the other of the first engagement member and the second engagement member includes an annular groove, and the first engagement member and the second engagement member are coaxially arranged with each other in a state where the cylindrical projection is fitted to the annular groove.

10. A movable spoiler device provided in a front part of a vehicle body, the movable spoiler device comprising:
- a link mechanism in which a plurality of links are, coupled and configured to operate by driving the links by an actuator;
- a spoiler member connected with one of the plurality of links and being deployable and retractable with respect to the vehicle body by operation of the link mechanism;
- a clutch mechanism provided on a driving force transmission path between the actuator and the spoiler member, and configured to block transmission of a driving force when an external force equal to or greater than a predetermined value is applied to the spoiler member with the spoiler member being in a deployed state; and
- a regulating portion configured to abut against the spoiler member to regulate rotation of the spoiler member when the spoiler member is rotated from the deployed state to a retracted state by the external force in a state where the transmission of the driving force is blocked by the clutch mechanism, wherein
- the link mechanism is operated in a state where the rotation of the spoiler member is regulated by the regulating portion such that the state where the transmission of the driving force is blocked by the clutch mechanism is returned to a state where the driving force is transmitted.

\* \* \* \* \*